US011057826B2

(12) United States Patent
Asterjadhi et al.

(10) Patent No.: US 11,057,826 B2
(45) Date of Patent: Jul. 6, 2021

(54) SCANNING ENHANCEMENTS FOR NEXT GENERATION WI-FI CHANNELS

(71) Applicant: QUALCOMM Incorporated, San Diego, CA (US)

(72) Inventors: Alfred Asterjadhi, San Diego, CA (US); George Cherian, San Diego, CA (US); Abhishek Pramod Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 16/548,571

(22) Filed: Aug. 22, 2019

(65) Prior Publication Data

US 2020/0068486 A1 Feb. 27, 2020

Related U.S. Application Data

(60) Provisional application No. 62/722,773, filed on Aug. 24, 2018.

(51) Int. Cl.
*H04L 5/00* (2006.01)
*H04W 48/16* (2009.01)
*H04W 84/12* (2009.01)

(52) U.S. Cl.
CPC .......... *H04W 48/16* (2013.01); *H04L 5/0007* (2013.01); *H04L 5/0055* (2013.01); *H04W 84/12* (2013.01)

(58) Field of Classification Search
CPC ............................. H04W 48/16; H04L 5/0007
See application file for complete search history.

(56) References Cited

U.S. PATENT DOCUMENTS

| 2014/0064128 A1* | 3/2014 | Park | H04W 76/00 370/252 |
| 2015/0156709 A1* | 6/2015 | Shukla | H04W 48/16 370/338 |

(Continued)

FOREIGN PATENT DOCUMENTS

WO WO-2019005523 A1 1/2019

OTHER PUBLICATIONS

Asterjadhi A., et al., (Qualcomm Inc): "Discovery Channels for 6 GHz band", IEEE Draft; 11-18-1624-00-00AX-DISCOVERY-CHANNELS-FOR-6-GHZ-BAND, IEEE-SA Mentor, Piscataway, NJ USA, vol. 802.11ax, Sep. 11, 2018, pp. 1-11, XP068128963, Retrieved from the Internet: URL:https://mentor.ieee.org/802.11/dcn/18/11-18-1624-00-00ax-discovery-channels-for-6-ghz-band.pptx [retrieved on Sep. 11, 2018-], Slides 2-9.

(Continued)

*Primary Examiner* — Fahmida S Chowdhury
(74) *Attorney, Agent, or Firm* — Holland & Hart LLP/Qualcomm

(57) ABSTRACT

Methods, systems, and devices for wireless communications are described. Generally, the described techniques provide that an access point (AP) or a station (STA) may identify, from a set of channels in a radio frequency spectrum band, a subset of discovery channels. The discovery channels may be designated for discovery signaling for device association. An AP may transmit discovery information for associating with a STA over a discovery channel from the subset of discovery channels. In some examples, the AP may receive a probe request from a STA operating in an active scanning mode, and may transmit the discovery information in a probe response. In some examples, the AP may transmit the discovery information in a periodic signal, such as a beacon, (Continued)

to a STA operating in a passive scanning mode. The AP may receive an association request and associate with the STA.

51 Claims, 20 Drawing Sheets

(56) References Cited

U.S. PATENT DOCUMENTS

| | | | | |
|---|---|---|---|---|
| 2015/0282063 A1* | 10/2015 | Patil | ................... | H04W 48/10 |
| | | | | 370/329 |
| 2016/0262090 A1* | 9/2016 | Marin | ............... | H04W 74/0816 |
| 2020/0107381 A1* | 4/2020 | Ahmad | ................ | H04W 12/06 |

OTHER PUBLICATIONS

Cherian G., et al., (QUALCOMM): "11 ax 6GHz OPERATION", IEEE DRAFT; 11-18-1256-00-00AX-11AX-6GHZ-OPERATION, IEEE-SA Mentor, Piscataway, NJ USA, vol. 802.11ax, Jul. 10, 2018, XP068128413, Retrieved from the Internet: URL:https://mentor.ieee.org/802.11/dcn/18/11-18-1256-00-00ax-11ax-6ghz-operation.pptx [retrieved on Jul. 10, 2018], Slides 2-4, pp. 1-8.
International Search Report and Written Opinion—PCT/US2019/047827—ISA/EPO—dated Oct. 29, 2019 (184605WO).

\* cited by examiner

| Channel | CH1 | CH2 | CH3 | CH4 | CH5 |
|---|---|---|---|---|---|
| Type | DC | SYS | SYS | SYS | DC |

| Channel | CH11 | CH12 | CH13 | CH14 | CH15 |
|---|---|---|---|---|---|
| Type | SYS | SYS | DC | SYS | SYS |

FIG. 3

SCANNING ENHANCEMENTS FOR NEXT GENERATION WI-FI CHANNELS

CROSS REFERENCE

The present application for patent claims the benefit of U.S. Provisional Patent Application No. 62/722,773 by ASTERJADHI, et al., entitled "SCANNING ENHANCEMENTS FOR NEXT GENERATION WI-FI CHANNELS," filed Aug. 24, 2018, assigned to the assignee hereof, and expressly incorporated herein.

BACKGROUND

The following relates generally to wireless communications, and more specifically to scanning enhancements for next generation Wi-Fi channels.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that communicates with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. The downlink (or forward link) may refer to the communication link from the AP to the STA, and the uplink (or reverse link) may refer to the communication link from the STA to the AP.

In some examples, wireless devices may operate on a next generation 6 GHz band. STAs may discover APs operating on the 6 GHz band via active or passive scanning. Available spectrum within the 6 GHz band, however, may be divided into a large number of channels (e.g., 64 20 MHz channels). Current Wi-Fi discovery procedures generally involve a STA scanning all available channels in a band to discover and connect to an AP. But the large number of channels available in next generation bands, such as the 6 GHz band, may make it impractical or inefficient for a STA to scan each of the channels. Scanning each of the channels may increase system latency and power consumption while decreasing user experience. Improvements to Wi-Fi discovery techniques are desired.

SUMMARY

The described techniques relate to improved methods, systems, devices, and apparatuses that support scanning enhancements for next generation Wi-Fi channels. Generally, the described techniques provide that an access point (AP) or a station (STA) may identify, from a set of channels in a radio frequency spectrum band, a subset of discovery channels. The discovery channels may be designated for discovery signaling for device association. An AP may transmit discovery information to a station for determining one or more channel access rules or whether to associate with the access point over a discovery channel from the subset of discovery channels. In some examples, the AP may receive a probe request over one of the discovery channels from a STA operating in an active scanning mode, and may transmit the discovery information in a probe response. In some examples, the AP may transmit the discovery information in a periodic signal, such as a beacon, to a STA operating in a passive scanning mode. The AP may receive an association request from the STA, and may associate with the STA based on the association request and the discovery channel.

A method of wireless communication at an access point is described. The method may include identifying, from a set of channels in a radio frequency spectrum b and, a subset of discovery channels designated for discovery signaling for device association and transmitting discovery information to a station for determining whether to associate with the access point over a channel from the set of channels.

An apparatus for wireless communication at an access point is described. The apparatus may include a first interface, a second interface, and a modem coupled to the first interface and the second interface. In some examples, the modem may be in communication with a transmitter via the first interface and may output for transmission via the first interface one or more messages, as described below. The modem may also be in communication with a receiver via the second interface, and may obtain messages via the second interface. The modem may be configured to identify, from a set of channels in a radio frequency spectrum b and, a subset of discovery channels designated for discovery signaling for device association and transmit discovery information to a station for determining whether to associate with the access point over a channel from the set of channels.

Another apparatus for wireless communication at an access point is described. The apparatus may include means for identifying, from a set of channels in a radio frequency spectrum b and, a subset of discovery channels designated for discovery signaling for device association and transmitting discovery information to a station for determining whether to associate with the access point over a channel from the set of channels.

A non-transitory computer-readable medium storing code for wireless communication at an access point is described. The code may include instructions executable by a processor to identify, from a set of channels in a radio frequency spectrum b and, a subset of discovery channels designated for discovery signaling for device association and transmit discovery information to a station for determining whether to associate with the access point over a channel from the set of channels.

In some examples of the method, apparatuses, and non-transitory computer-readable medium described herein, the channel from the set of channels includes a discovery channel of the subset of discovery channels.

Some examples of the method, apparatuses, and non-transitory computer-readable medium described herein may further include operations, features, means, or instructions for receiving an association request from the station based on the discovery information transmitted over the discovery channel, and associating with the station based on the association request and the discovery channel.

In some examples of the method, apparatuses, and non-transitory computer-readable medium described herein, the subset of discovery channels includes a set of contiguous channels of the set of channels.

In some examples of the method, apparatuses, and non-transitory computer-readable medium described herein, the subset of discovery channels includes a set of non-contiguous channels having a non-unitary periodicity. The subset of discovery channels may include a 20 megahertz (MHz) channel, and the non-unitary periodicity may include a periodicity of 4 channels.

Some examples of the method, apparatuses, and non-transitory computer-readable medium described herein may further include operations, features, means, or instructions for receiving a probe request from the station, where transmitting the discovery information may be based on receiving the probe request, and where the discovery information includes a probe response.

Some examples of the method, apparatuses, and non-transitory computer-readable medium described herein may further include operations, features, means, or instructions for identifying one or more neighbor access points, and including a neighbor access point report indicating the identified one or more neighbor access points in the probe response.

In some examples of the method, apparatuses, and non-transitory computer-readable medium described herein, at least one of the one or more neighbor access points may be collocated with the reporting access point.

Some examples of the method, apparatuses, and non-transitory computer-readable medium described herein may further include operations, features, means, or instructions for identifying a first set of access points within a first bandwidth including the set of channels corresponding to a basic service set (BSS), and identifying a second set of access points that operate outside the first bandwidth including the set of channels corresponding to the BSS, where the neighbor access point report includes both the first set of access points and the second set of access points.

Some examples of the method, apparatuses, and non-transitory computer-readable medium described herein may further include operations, features, means, or instructions for randomly selecting a time for transmitting the probe response from a minimum channel time for transmission of the probe response on the channel from the set of channels, where the channel from the set of channels includes a discovery channel of the subset of discovery channels.

Some examples of the method, apparatuses, and non-transitory computer-readable medium described herein may further include operations, features, means, or instructions for randomly selecting a resource unit (RU) of an orthogonal frequency division multiple access frame, where the probe response or an association response corresponding to the probe request may be output via the first interface over the selected resource unit. In some examples, the RU may be a broadcast RU carried on a downlink multi-user physical layer convergence procedure (PLCP) protocol data unit (PPDU).

Some examples of the method, apparatuses, and non-transitory computer-readable medium described herein may further include operations, features, means, or instructions for generating a fast initial link setup (FILS) discovery frame, and broadcasting the FILS discovery frame.

In some examples of the method, apparatuses, and non-transitory computer-readable medium described herein, the FILS discovery frame may be broadcast periodically.

Some examples of the method, apparatuses, and non-transitory computer-readable medium described herein may further include operations, features, means, or instructions for randomly selecting a time from a minimum channel time for transmission of the FILS discovery frame on the channel from the set of channels, where the channel from the set of channels includes a discovery channel of the subset of discovery channels.

Some examples of the method, apparatuses, and non-transitory computer-readable medium described herein may further include operations, features, means, or instructions for receiving a first broadcast probe request from a second station operating in an active scanning mode, where generating the FILS discovery frame and broadcasting the FILS discovery frame may be based on the first broadcast probe request.

Some examples of the method, apparatuses, and non-transitory computer-readable medium described herein may further include operations, features, means, or instructions for identifying one or more neighbor access points, and including a neighbor access point report indicating the identified one or more neighbor access points in the FILS discovery frame.

Some examples of the method, apparatuses, and non-transitory computer-readable medium described herein may further include operations, features, means, or instructions for transmitting a management frame including a message integrity check (MIC) to a second access point.

Some examples of the method, apparatuses, and non-transitory computer-readable medium described herein may further include operations, features, means, or instructions for detecting a neighbor access point report transmitted by a second access point, determining a number of neighbor access points indicated by the neighbor access point report, and generating management frames with a periodicity that may be based on the number of neighbor access points.

Some examples of the method, apparatuses, and non-transitory computer-readable medium described herein may further include operations, features, means, or instructions for identifying a station that may be located within a geographic coverage area of the access point and may be also within a geographic coverage area of a second access point, where the second access point may be outside the geographic coverage area of the access point, and configuring the identified station to propagate management information to the second access point.

Some examples of the method, apparatuses, and non-transitory computer-readable medium described herein may further include operations, features, means, or instructions for transmitting a trigger frame to the identified station.

A method of wireless communication at a station is described. The method may include identifying, from a set of channels in a radio frequency spectrum band, a subset of discovery channels designated for discovery signaling for device association and receiving discovery information from an access point for determining whether to associate with the access point over a channel from the set of channels.

An apparatus for wireless communication at a station is described. The apparatus may include a first interface, a second interface, and a modem coupled to the first interface and the second interface. In some examples, the modem may be in communication with a transmitter via the first interface, and may output for transmission via the first interface one or more messages, as described below. The modem may also be in communication with a receiver via the second interface, and may obtain messages via the second interface. The modem may be configured to identify, from a set of channels in a radio frequency spectrum band, a subset of discovery channels designated for discovery signaling for device association and receive discovery information from an access point for determining whether to associate with the access point over a channel from the set of channels.

Another apparatus for wireless communication at a station is described. The apparatus may include means for identifying, from a set of channels in a radio frequency spectrum band, a subset of discovery channels designated for discovery signaling for device association and receiving discovery information from an access point for determining whether to associate with the access point over a channel from the set of channels.

A non-transitory computer-readable medium storing code for wireless communication at a station is described. The code may include instructions executable by a processor to identify, from a set of channels in a radio frequency spectrum band, a subset of discovery channels designated for discovery signaling for device association and receive discovery information from an access point for determining whether to associate with the access point over a channel from the set of channels.

In some examples of the method, apparatuses, and non-transitory computer-readable medium described herein, the channel from the set of channels includes a discovery channel of the subset of discovery channels.

Some examples of the method, apparatuses, and non-transitory computer-readable medium described herein may further include operations, features, means, or instructions for transmitting an association request to the access point based on the discovery information transmitted over the discovery channel, and associating with the access point based on the association request and the discovery channel.

In some examples of the method, apparatuses, and non-transitory computer-readable medium described herein, the subset of discovery channels includes a set of contiguous channels of the set of channels.

In some examples of the method, apparatuses, and non-transitory computer-readable medium described herein, the subset of discovery channels includes a set of non-contiguous channels having a non-unitary periodicity.

Some examples of the method, apparatuses, and non-transitory computer-readable medium described herein may further include operations, features, means, or instructions for scanning the subset of discovery channels, where receiving the discovery information on the discovery channel may be based on the scanning.

Some examples of the method, apparatuses, and non-transitory computer-readable medium described herein may further include operations, features, means, or instructions for transmitting a probe request to the access point over the channel from the set of channels, where the channel from the set of channels includes a discovery channel of the subset of discovery channels, and where receiving the discovery information may be received in a probe response based on the probe request.

Some examples of the method, apparatuses, and non-transitory computer-readable medium described herein may further include operations, features, means, or instructions for broadcasting the probe request while operating in an active scanning mode, and where receiving the discovery information from the access point for determining whether to associate with the access point includes receiving a probe response from a neighboring access point in response to the probe request, the probe response including a neighbor access point report corresponding to the access point.

In some examples of the method, apparatuses, and non-transitory computer-readable medium described herein, the probe response may be received as one or more of an ACK frame or an orthogonal frequency-division multiple access (OFDMA) frame.

Some examples of the method, apparatuses, and non-transitory computer-readable medium described herein may further include operations, features, means, or instructions for receiving an ACK frame based on the probe request, refraining from transmitting a second probe request for a minimum channel time for transmitting on the discovery channel, and receiving, during the minimum channel time, the probe response.

Some examples of the method, apparatuses, and non-transitory computer-readable medium described herein may further include operations, features, means, or instructions for identifying a minimum channel time for transmitting the probe request to the access point over the discovery channel, where outputting the probe request further includes outputting, via the first interface, the probe request prior to expiration of the minimum channel time.

Some examples of the method, apparatuses, and non-transitory computer-readable medium described herein may further include operations, features, means, or instructions for broadcasting the probe request while operating in an active scanning mode, and where receiving the discovery information from the access point for determining whether to associate with the access point includes receiving a probe response from a neighboring access point in response to the probe request, the probe response including a neighbor access point report corresponding to the access point.

In some examples of the method, apparatuses, and non-transitory computer-readable medium described herein, at least one of the one or more neighbor access points indicated in the neighbor access point report may be collocated with the reporting access point.

Some examples of the method, apparatuses, and non-transitory computer-readable medium described herein may further include operations, features, means, or instructions for receiving a propagation configuration message from the access point, reconfiguring to a management information propagation mode, receiving management information from the access point, and transmit the management information to a second access point.

In some examples of the method, apparatuses, and non-transitory computer-readable medium described herein, the propagation configuration message includes a trigger frame.

Some examples of the method, apparatuses, and non-transitory computer-readable medium described herein may further include operations, features, means, or instructions for identifying a restricted access mode based on one or more channel access rules, determining that an unsolicited management frame may be not permitted on the radio frequency spectrum band based on the restricted access mode, and waiting to receive a random access resource unit (RU) from the station or transmitting a probe request on a second radio frequency spectrum band based on the restricted access mode.

BRIEF DESCRIPTION OF THE DRAWINGS

FIG. 3 illustrates an example of a channel designation scheme that supports scanning enhancements for next generation Wi-Fi channels in accordance with aspects of the present disclosure.

DETAILED DESCRIPTION

Figure 1:
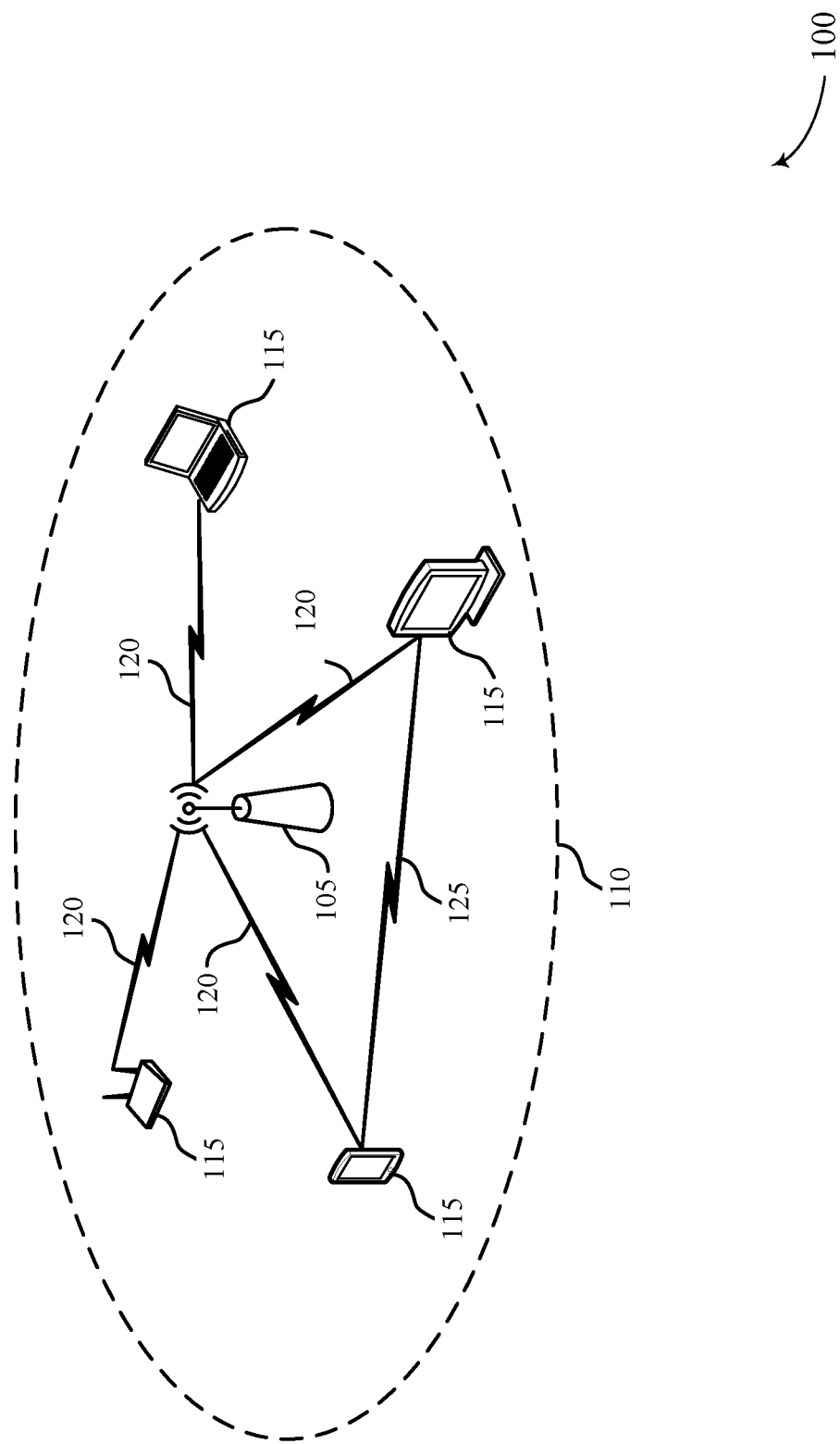
FIG. 1 illustrates an example of a system for wireless communications that supports scanning enhancements for next generation Wi-Fi channels in accordance with aspects of the present disclosure.

In some examples, a wireless communication system may support communication on one or more bands. For instance, the wireless communication system may support communication using a next generation 6 GHz band. A large number of channels may be available for use in the next generation 6 GHz band or other bands.

In some examples, access to a 6 GHz band may be limited or regulated. Scanning all available channels may result in system and power usage inefficiency. For instance, if a STA performs active or passive scanning on all available channels of a wide band, then system latency and power consumption of the STA may increase. For instance, for some applications (e.g., virtual reality or augmented reality applications, real-time voice, video, and gaming applications, or industrial internet of things (I-IOT) applications), system latency may be so great that quality of service requirements cannot be consistently satisfied. Such increased scanning may also result in increased power consumption at each device.

Additionally, access to the 6 GHz band may be limited to passive scanning to avoid uncontrolled or unlimited probe requests on the 6 GHz band that may cause channel pollution. Legacy Wi-Fi devices may not be capable of operating on a channel within the 6 GHz band, and legacy procedures for channel access may not apply.

In some examples, to avoid channel pollution from multiple STAs, system latency, excessive power expenditure at a STA, a subset of available channels may be designated as discovery channels, and remaining channels may be designated for normal operations such as traffic delivery. This may result in a lesser percentage of time spent on scanning by the STAs served by an AP in a geographic coverage area, and increased throughput.

The subset of discovery channels may be contiguous, or equally spaced and non-contiguous. For instance, the subset may be located in a particular portion of the available bandwidth. Discovery channels may be located, for example, in the lowest portion of the available bandwidth (e.g., channels 1 through 8). In some examples, the discovery channels may be equally spaced, and located at standardized locations, or the location of the discovery channels may be provided by a third part. The spacing of discovery channels may have a non-unitary periodicity. For instance, the discovery channels may have a periodicity of 4, and may be located at channel 1, channel 5, channel 9, channel 13, and so forth. Or, the discovery channels may have a periodicity of 8, and may be located at channel 1, channel 9, channel 17, and so forth. The discovery channels may similarly have a periodicity of 1 channel, 16 channels, 32 channels, etc. Higher discovery channel periodicity may result in less scanning latency with less discovery channels, and more efficiency with more non-discovery channels.

As described in greater detail below, utilizing discovery channels for discovery and association may improve system throughput, increase system efficiency, and decrease power consumption at each device. Devices may identify designated discovery channels, and may use the discovery channels to perform various aspects of discovery and association procedures.

Aspects of the disclosure are initially described in the context of a wireless communications system. Aspects of the disclosure are further illustrated by and described with reference to channel designation schemes and process flows. Aspects of the disclosure are further illustrated by and described with reference to apparatus diagrams, system diagrams, and flowcharts that relate to scanning enhancements for next generation Wi-Fi in greenfield channels.

Generally, the described techniques provide that an access point (AP) or a station (STA) may identify, from a set of channels in a radio frequency spectrum band, a subset of discovery channels. The discovery channels may be designated for discovery signaling for device association. An AP may transmit a discovery frame including discovery information to a STA for determining one or more channel access rules or whether to associate with the access point over a discovery channel from the subset of discovery channels. In some examples, the discovery frame may be a FILS discovery frame, a broadcast probe response, or a beacon frame. In some examples, the AP may receive a probe request from a STA operating in an active scanning mode, and may transmit the discovery information in a probe response. In some examples, the AP may transmit the discovery information in a periodic signal, such as a beacon, to a STA operating in a passive scanning mode. The AP may receive an association request from the STA, and may associate with the STA based on the association request and the discovery channel.

FIG. 1 illustrates an example of a wireless local area network (WLAN) 100 (also known as a Wi-Fi network) that supports a configuration for distributed resource units (RUs) in accordance with aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a geographic coverage area 110 of the AP 105, which may represent a basic service area (BSA) of the WLAN 100. An extended network station (not shown) associated with the WLAN 100 may be connected to a wired or wireless distribution system that may allow multiple APs 105 to be connected in an ESS. These APs 105 and STAs 115 may communicate using distributed RUs.

Although not shown in FIG. 1, a STA 115 may be located in the intersection of more than one geographic coverage area 110 and may associate with more than one AP 105. A single AP 105 and an associated set of STAs 115 may be referred to as a BSS. An extended service set (ESS) is a set of connected BSSs. A distribution system (not shown) may be used to connect APs 105 in an ESS. In some cases, the geographic coverage area 110 of an AP 105 may be divided into sectors (also not shown). The WLAN 100 may include APs 105 of different types (e.g., metropolitan area, home network, etc.), with varying and overlapping geographic coverage areas 110. Two STAs 115 may also communicate directly via a direct wireless link 125 regardless of whether both STAs 115 are in the same geographic coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and media access control (MAC) layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

In some cases, a STA 115 (or an AP 105) may be detectable by a central AP 105, but not by other STAs 115 in the geographic coverage area 110 of the central AP 105. For example, one STA 115 may be at one end of the geographic coverage area 110 of the central AP 105 while another STA 115 may be at the other end. Thus, both STAs 115 may communicate with the AP 105, but may not receive the transmissions of the other. This may result in colliding transmissions for the two STAs 115 in a contention-based environment (e.g., CSMA/CA) because the STAs 115 may not refrain from transmitting on top of each other. A STA 115 whose transmissions are not identifiable, but that is within the same geographic coverage area 110 may be known as a hidden node. CSMA/CA may be supplemented by the exchange of a request to send (RTS) packet transmitted by a sending STA 115 (or AP 105) and a clear to send (CTS) packet transmitted by the receiving STA 115 (or AP 105). This may alert other devices within range of the sender and receiver not to transmit for the duration of the primary transmission. Thus, RTS/CTS may help mitigate a hidden node problem.

In some systems, WLAN 100 may support multi-user communication over a given channel bandwidth. For example, a channel bandwidth may be divided into a number of RUs, where each RU may contain a predefined number of tones or subcarriers. Each of these RUs may be assigned to devices for communication. For example, an AP 105 may allocate one or more of the RUs to a STA 115 for communication. This STA 115 may receive downlink data over the allocated RU or may transmit uplink data over the allocated RU. Pilot signals may be sent with the data to improve reception reliability of the data. WLAN 100 may support many different RU and bandwidth sizes. For example, WLAN 100 may support distributed RUs for RUs containing 26 tones, 52 tones, 106 tones, etc., and may support channel bandwidths spanning 20 megahertz (MHz), 40 MHZ, 80 MHz, 160 MHz, etc. In some cases, larger RUs may be constructed using smaller RUs as building blocks. For example, the tones allocated for an RU containing 52 tones may correspond to the physical tones for two logic RUs with 26 tones.

In some examples, an AP 105 or a STA 115 may identify, from a set of channels in a radio frequency spectrum band, a subset of discovery channels. The discovery channels may be designated for discovery signaling for device association. An AP 105 may transmit discovery information to a STA for determining one or more channel access rules or whether to associate with the access point over a discovery channel from the subset of discovery channels. In some examples, the AP 105 may receive a probe request from a STA 115 operating in an active scanning mode, and may transmit the discovery information in a probe response. In some examples, the AP 105 may transmit the discovery information in a periodic signal, such as a beacon, to a STA 115 operating in a passive scanning mode. The AP 105 may receive an association request from the STA 115, and may associate with the STA based on the association request and the discovery channel. An advantage of transmitting discovery information for determining whether to associate with the access point of a discovery channel and receiving a probe request from a STA 115 may be to avoid channel pollution from multiple STAs, system latency, and excessive power expenditure at a STA, resulting in increased battery life and improved user experience.

Figure 2:
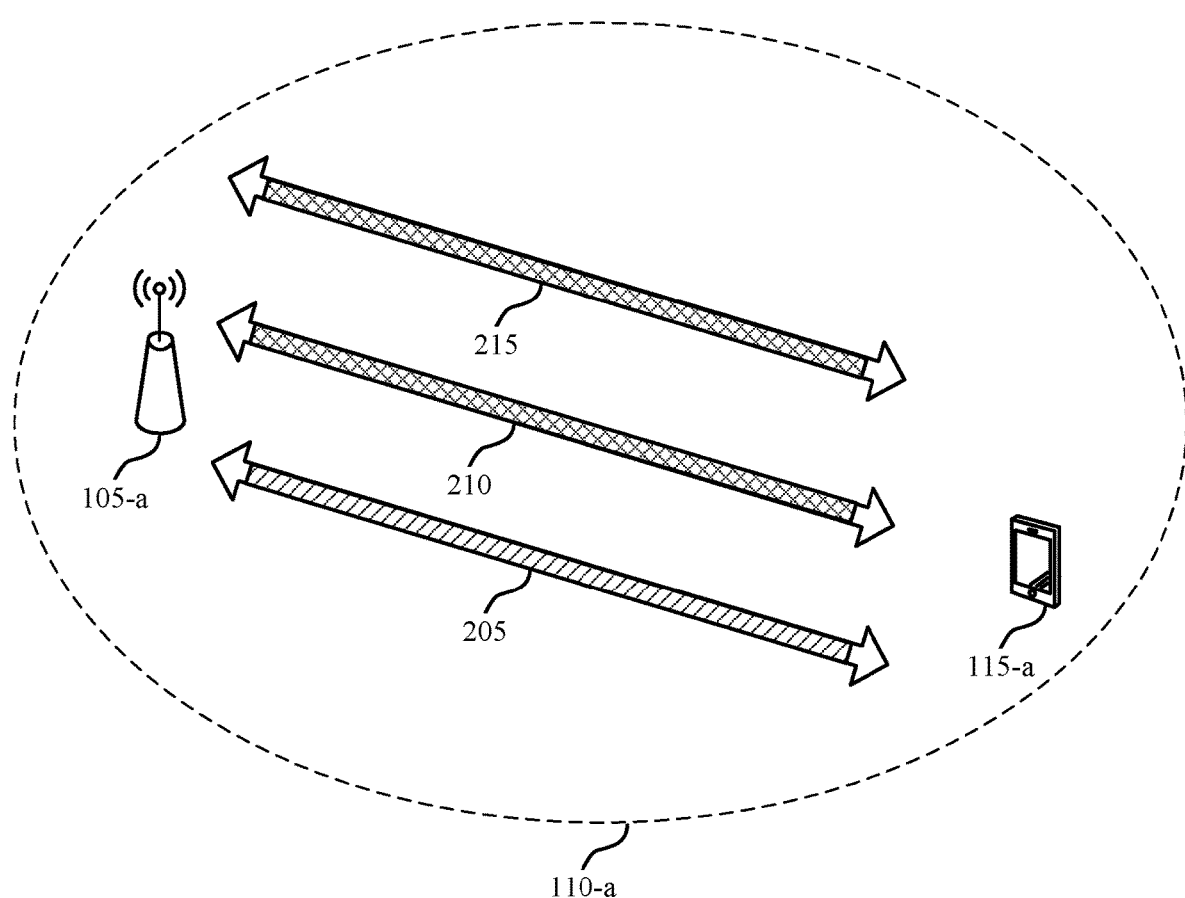
FIG. 2 illustrates an example of a wireless communication system that supports scanning enhancements for next generation Wi-Fi channels in accordance with aspects of the present disclosure.

FIG. 2 illustrates an example of a WLAN 200 that supports scanning enhancements for next generation Wi-Fi in greenfield channels in accordance with aspects of the present disclosure. In some examples, WLAN 200 may implement aspects of WLAN 100 and may include AP 105-a and STA 115-a, which may be examples of the corresponding devices described with reference to FIG. 1.

In some examples, an AP 105-a may communication with one or more STAs 115-a within a geographic coverage area 110-a. In some examples, AP 105-a and STA 115-a may communicate on a band (e.g., a 6 GHz band) with multiple available channels (e.g., channel 205, channel 210, channel 215, and the like). In some examples, STA 115-a may be capable of scanning each available channel. In some examples, each of channels 205, 210, 215, and other available channels within the band may be greenfield channels (i.e., no legacy devices utilize the greenfield channels).

Performing active or passive scanning on all available channels may result in spectrum and power usage inefficiency. If STA 115-a and other STAs 115 in geographic coverage area 110-a perform active or passive scanning on each of channels 205, 210, 215, and other available channels, then system latency may increase. For instance, STA 115-a may perform scanning with a total scan time of up to 1.2 seconds where a minimum channel time (e.g., minimum amount of time a device will wait to determine whether a channel is free) is equal to 20 ms. If each STA 115 in geographic coverage area 110-*a* performs such active or passive scanning on all available channels (e.g., all 64 available channels in a 6 GHz band) then a large percentage of time will be taken up with scanning, leaving less time for normal operations and traffic delivery. This excessive scanning time may result in increased latency and decreased system efficiency. For instance, some applications (e.g., virtual reality or augmented reality applications, real-time voice, video, and gaming applications, or industrial internet of things (I-IOT) applications), system latency may be so great that quality of service requirements cannot be consistently satisfied. Such increased scanning may also result in increased power consumption at STA 115-*a*.

In some examples, a subset of available channels may be designated as discovery channels, and remaining channels may be designated for normal operations such as traffic delivery. For instance, channel 205 may be designated as a discovery channel, and channels 210 and 215 may be designated for traffic delivery and other non-discovery operations. This may result in a lesser percentage of time spent on scanning by the STA 115-*a* served by AP 105-*a* in geographic coverage area 110-*a*, and increased throughput.

The subset of discovery channels may be contiguous, or equally spaced and non-contiguous. For instance, the subset may be located in a particular portion of the available bandwidth. Discovery channels may be located, for example, in the lowest portion of the available bandwidth (e.g., channels 1 through 8). In some examples, the discovery channels may be equally spaced, and located at standardized locations, or the location of the discovery channels may be provided by a third party. The spacing of discovery channels may have a non-unitary periodicity. For instance, the discovery channels may have a periodicity of 4, and may be located at channel 1, channel 5, channel 9, channel 13, and so forth. Or, the discovery channels may have a periodicity of 8, and may be located at channel 1, channel 9, channel 17, and so forth. The discovery channels may similarly have a periodicity of 1 channel, 16 channels, 32 channels, etc. Higher discovery channel periodicity may result in less scanning latency with less discovery channels, and more efficiency with more non-discovery channels.

As described in greater detail with respect to FIGS. 3 through 7, utilizing discovery channels for discovery and association may improve system throughput, increase system efficiency, and decrease power consumption at each device. For instance, a STA may be able to rapidly discovery APs by scanning only discovery channels with no assistance from a 2.4 GHz band or a 5 GHz band. The STA may determine, based on scanning the discovery channels or based on receiving a probe response from an AP, whether to associate with the AP. For instance, the AP may indicate a non-discovery channel from an available bandwidth on which to receive discovery information. Devices may identify designated discovery channels, and may use the discovery channels to perform various aspects of discovery and association procedures.

FIG. 3 illustrates an example of a channel designation scheme 300 that supports scanning enhancements for next generation Wi-Fi in greenfield channels in accordance with aspects of the present disclosure. In some examples, channel designation scheme 300 may implement aspects of WLAN 100.

In some examples, a subset of available channels within a total available bandwidth 305 may be designated as discovery channels. Available bandwidth 305 may include, for example, 1280 MHz within a 6 GHz channel. Discovery channels may be contiguous or non-contiguous. Where discovery channels are non-contiguous, they may be equally spaced among other system channels with a particular periodicity. Different periodicities may correspond to different maximum scan times and ratios between discovery channels and other system channels. For instance, a discovery channel periodicity of 1 channel (i.e., each of 64 available channels is a discovery channel) may have a maximum scan time of 1280 ms, and a system (SYS) ratio (e.g., the percentage of channels with no active scanning activity that are reserved for post-association traffic) of 0 percent. A discovery channel periodicity of 4 channels (e.g., 16 channels out of 64 available channels are discovery channel) may have a maximum scan time of 320 ms and a SYS ratio of 75 percent. A discovery channel periodicity of 8 channels (e.g., 8 channels out of 64 available channels are discovery channels) may have a maximum scan time of 160 ms, and a SYS ratio of 87.5 percent. A discovery channel periodicity of 16 channels (e.g., 4 channels out of 64 available channels are discovery channels) may have a maximum scan time of 80 ms and a SYS ratio of 93.5 percent. A discovery channel periodicity of 32 channels (e.g., 2 channels out of 64 available channels are discovery channels) may have a maximum scan time of 40 ms and a SYS ratio of 98.3 percent.

A higher discovery channel periodicity with less discovery channels may result in less scanning latency. More non-discovery channels may result in higher system efficiency. In some examples, discovery channels may be evenly spaced with other system channels. In one illustrative example, discovery channels may have a periodicity of 4. Thus, channel 1, channel 5, channel 9, channel 13, and so forth, may be designated as discovery channels. In another illustrative example, a discovery channel periodicity may be 8 channels, such that channel 1, channel 9, channel 17, and so forth, may be designated as discovery channels.

An AP may be configured to satisfy a discovery channel periodicity. For instance, an AP may be configured to operate with enough bandwidth to cover at least one discovery channel. For example, if the discovery channel periodicity is 4 channels (e.g., 80 megahertz (MHz) for 4 20 MHz channels), then the AP may be configured to operate with at least 80 MHz. Similarly, if the discovery channel periodicity is 8 channels (e.g., 160 MHz for 8 20 MHz channels), then the AP may be configured to operate with at least 160 MHz. If the discovery channel periodicity is 16 channels, then the AP may be configured to operate with at least 320 MHz, and so forth. In some examples, an AP may delegate a neighbor AP to cover a discovery channel if the AP is not configured to cover at least one discovery channel. For instance, if the AP is configured to operate with 80 MHz, but the discovery channel periodicity is 8 channels, then the AP may delegate a neighbor AP that includes a discovery channel in its operating bandwidth, and the neighbor AP may perform discovery procedures on behalf of the AP. In such examples, each AP may include a neighbor report information element that includes neighbor AP information, allowing one AP to transmit discovery information to a STA that includes discovery information for all neighbor APs. In some example, an AP may operate with a dual-radio. One radio may operate in discovery channels, and the other radio may operate in non-discovery channels. AP configurations that satisfy discovery channel periodicities are described in further detail with respect to FIG. 4.

Figure 4:
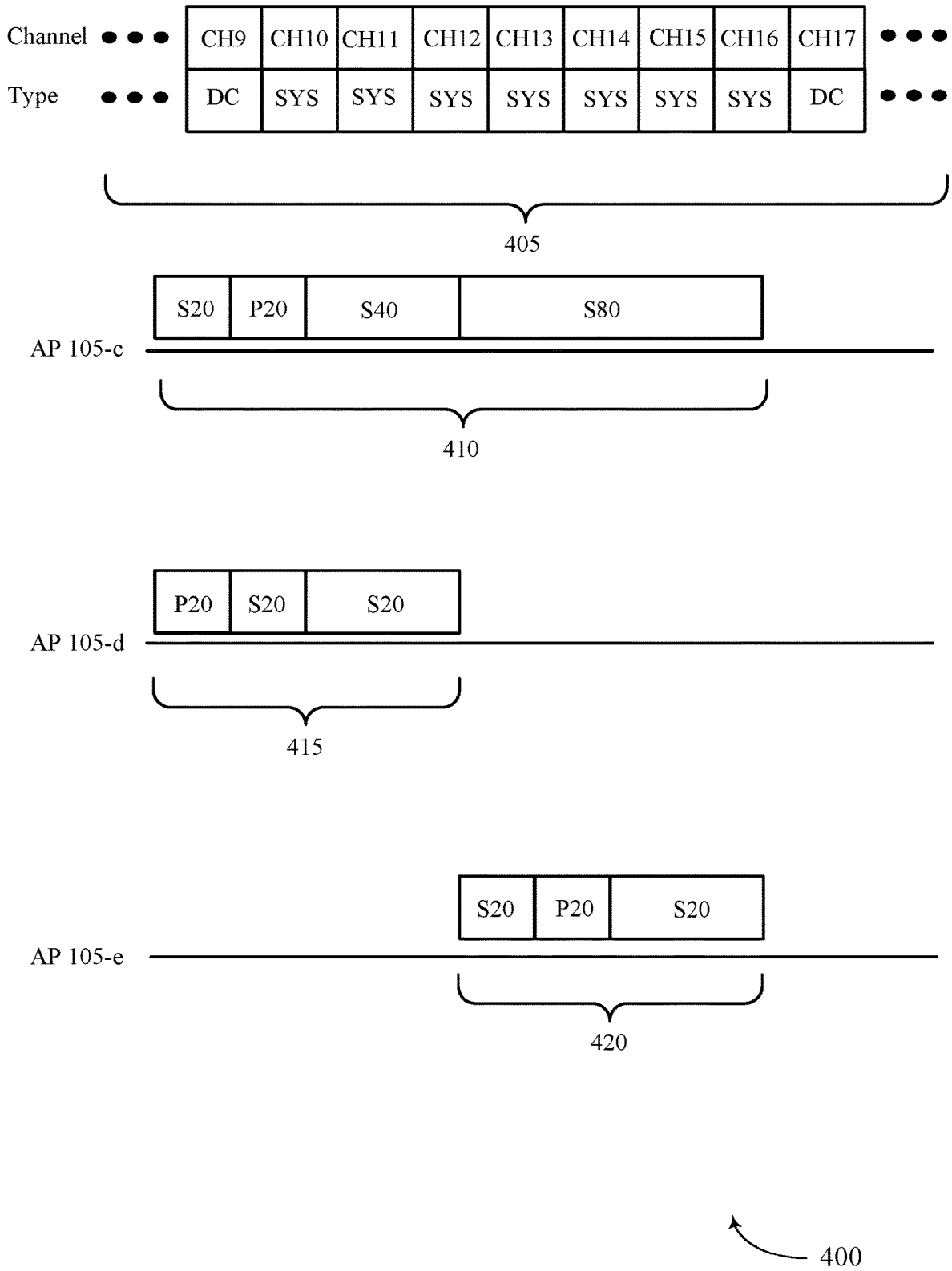
FIG. 4 illustrates an example of a channel designation scheme that supports scanning enhancements for next generation Wi-Fi channels in accordance with aspects of the present disclosure.

FIG. 4 illustrates an example of a channel designation scheme 400 that supports scanning enhancements for next generation Wi-Fi in greenfield channels in accordance with aspects of the present disclosure. In some examples, channel designation scheme 400 may implement aspects of WLAN 100.

In some examples, APs 105 may be configured to operate within total available bandwidth 405. Total available bandwidth 405 may be 1280 MHz of a 6 GHz band. Total available bandwidth 405 may include multiple channels. Some channels may be designated as discovery channels, and remaining system channels may be non-discovery channels designated for post-association transmissions.

APs 105 may be configured with operating bandwidths for a particular BSS. For instance, AP 105-c may be configured with BSS operating bandwidth 410, AP 105-d may be configured with BSS operating bandwidth 415, and AP 105-e may be configured with BSS operating bandwidth 420. Operating bandwidths for each AP 105 may include a primary channel and one or more secondary channels. Discovery channels may be primary channels or secondary channels.

As illustrated in FIG. 4, AP 105-c may be configured with a BSS operating bandwidth 410, which may be, for example, 160 MHz covering 8 channels (e.g., channel 9 through channel 16). If the discovery channel periodicity is 8 channels, then at least one discovery channel (e.g., channel 8) will be included in BSS operating bandwidth 410. Even if BSS operating bandwidth 410 is lower or higher it will still include a discovery channel because the discovery channel periodicity is 8 channels.

AP 105-d may be configured with a BSS operating bandwidth 415, which may be, for example, 80 MHz covering 4 channels (e.g., channel 9 through channel 12). If the discovery channel periodicity is 8 channels, then BSS operating bandwidth 415 may or may not include one discovery channel. AP 105-d may set up BSs operating bandwidth 415 to include one discovery channel. In an illustrative example, BSS operating bandwidth 415 may include discovery channel 9.

AP 105-e may be configured with BSS operating bandwidth 420, which may be 80 MHz covering 4 channels that may be different from the channels covered by BSS operating bandwidth 415. BSS operating bandwidth 420 may cover, for example, channel 13 through channel 12. However, none of channels 13 through 12 may be a discovery channel. AP 105-e may delegate a neighboring AP to report on its behalf AP 105-e may indicate to AP 105-d, for example, that AP 105-e delegates AP 105-d to send discovery information for AP 105-e to STAs served by AP 105-e. That is, when configured to serve as a delegated AP 105, AP 105-d (which has a discovery channel included in BSS operating bandwidth 415) may include an AP 105 neighbor report when it transmits its own discovery information. Thus, discovery information transmitted by AP 105-d may include discovery information for AP 105-d and a neighbor AP 105 report including discovery information for AP 105-e. In such examples, a STA that receives discovery information from AP 105-d on channel 9 may also receive discovery information for AP 105-e.

A discovery channel may be a primary channel or a secondary channel. A primary channel may be a 20 MHz channel to which a secondary channel may be aggregated to from a wide channel for increased throughput. A primary channel that is separate from the discovery channel may be dependent upon the discovery channel. Or, a primary channel may be a discovery channel.

In an illustrative example, BSS operating bandwidth 410 for AP 105-c may have a primary channel (e.g., channel 10) that does not coincide with the discovery channel (e.g., channel 9). In such cases, the primacy channel may depend from the discovery channel. In such examples, post-association operations may be performed independent from pre-association operations. Pre-association operations may be performed on the discovery channel, and post-association procedures may be performed on the primary channel (e.g., channel 10). This case may be utilized for low latency applications, which may be performed by extremely high throughput (EHT) devices.

In another illustrative example, BSS operating bandwidth 415 for AP 105-d may have a primary channel that coincides with the discovery channel. (e.g., channel 9). In such examples, all STAs served by AP 105-d may contend for access on the same channel (e.g., the primary channel, channel 9). Such examples may be utilized by high efficiency (HE) devices. Such examples may be the simplest option because contention occurs in the same channel.

In some cases, an AP 105 may operate its BSS as per a baseline. For instance, EDCA-based contention may occur on the primary channel. Passive and active scanning may be performed in discovery channels. If the primary channel and the discovery channel are independent channels, then the AP 105 may utilize additional enhanced distributed channel access (EDCA) backoff counter for the discovery channel. In some examples, the AP 105 may count down in the primacy channel, but may send transmissions of the discovery channel. For instance, the AP 105 may duplicate a transmission, puncture a preamble, transmit a downlink multi user (MU) physical layer convergence procedure (PLCP) protocol data unit (PPDU), etc. A FILS discovery frame (which may be referred to as an FD frame), or any management frame already scheduled for delivery (e.g., a beacon frame) may be transmitted with or included in a probe response, and may be sent in the discovery channel in a downlink SU PPDU, or a downlink MU PPDU (e.g., in broadcast RUs). For example, in a multi-user system, an RU in a downlink MU PPDU may carry a management frame. A DL MU PPDU may have several RUs, and each RU may carry a MAC protocol data unit (MPDU). The MPDU may be broadcast or individually addressed (e.g., determined based on the identifier associated with the RU). The RU carrying the discovery frame (e.g., an FD frame, or a broadcast probe response) may lie on the sub-channel corresponding to the discovery channel. The rest of the RUs may carry individually addressed frames for other STAs 115 already associated with the AP 105. The downlink MU PPDU may be transmitted over an RU that falls on the discovery channel. The AP 105 may transmit PPDUs for STAs associated with the AP 105 over other RUs. Transmitting a FILS frame with increased frequency may result in a minimal impact on medium efficiency.

Preamble punctured PPDUs may be sent if any other sub-channel is busy at a transmission time. In some examples, an AP 105 may determine whether to transmit a FILS discovery frame, a probe response, or a beacon frame, prior to the transmission time for sending such signals. That is, prior to a periodic beacon transmission, or prior to a probe response triggered by a probe request, an AP 105 may determine which type of frame or signal to transmit.

Figure 5:
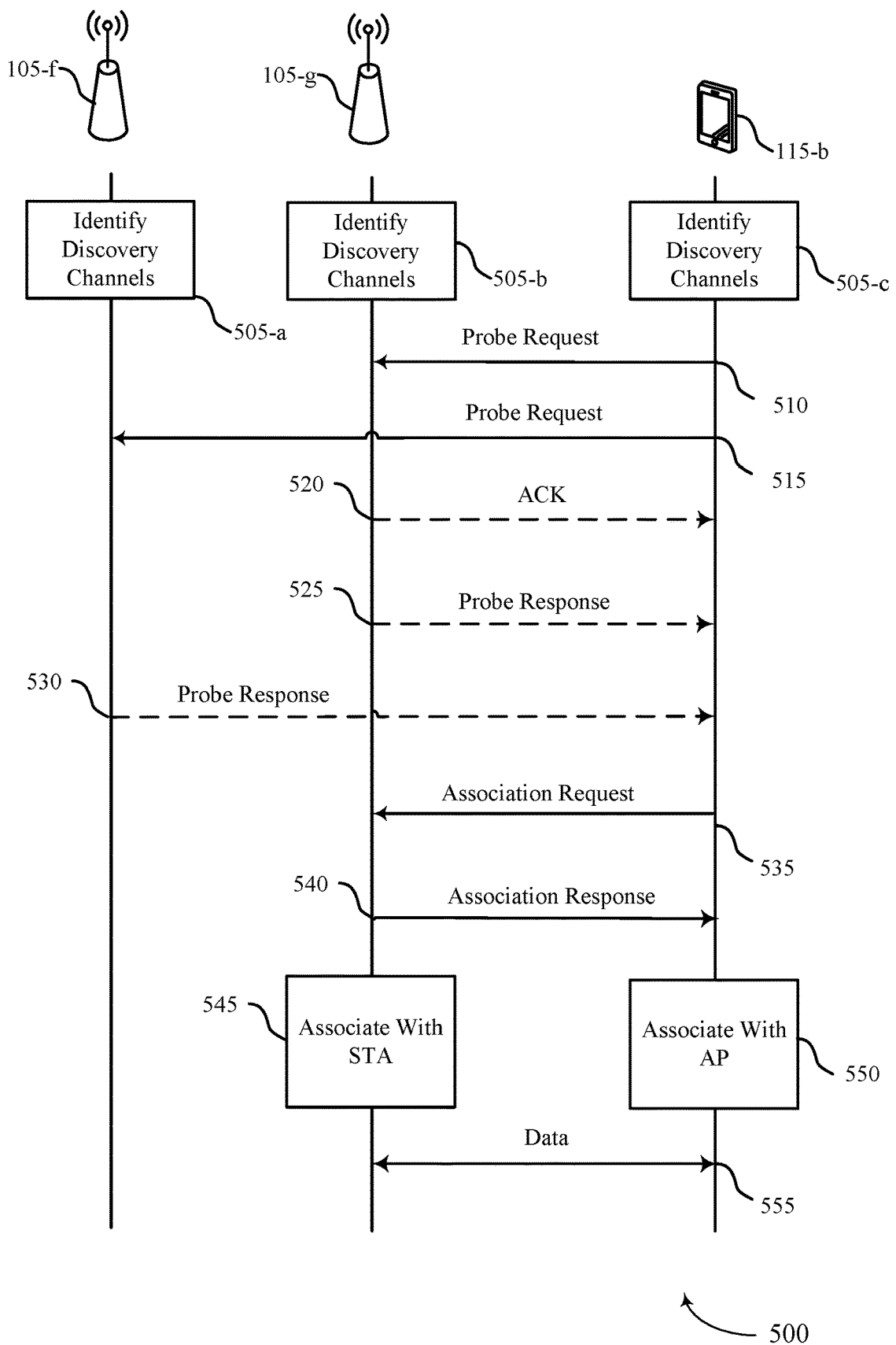
FIG. 5 illustrates an example of a process flow that supports scanning enhancements for next generation Wi-Fi channels in accordance with aspects of the present disclosure.
Figure 6:
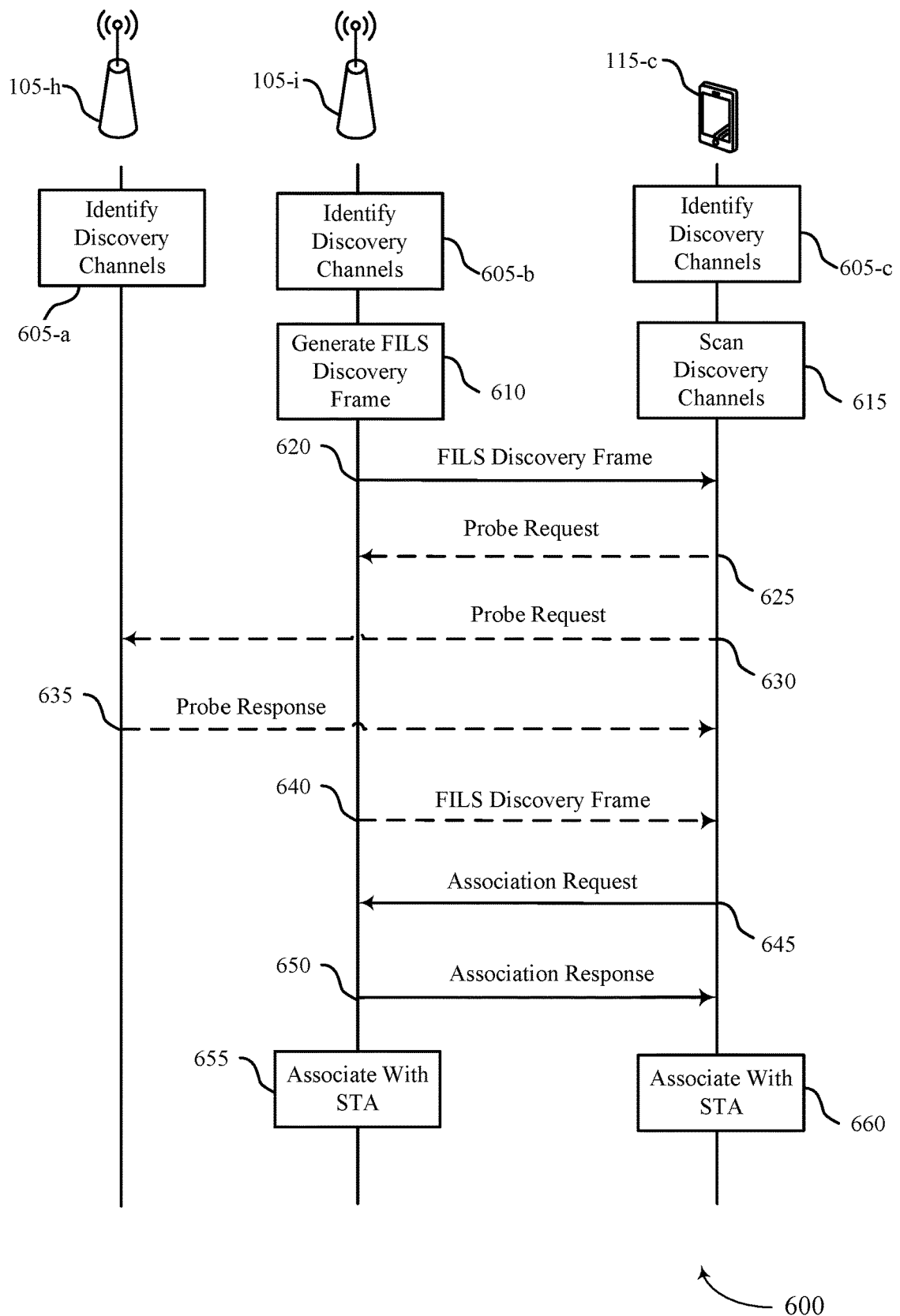
FIG. 6 illustrates an example of a process flow that supports scanning enhancements for next generation Wi-Fi channels in accordance with aspects of the present disclosure.
Figure 7:
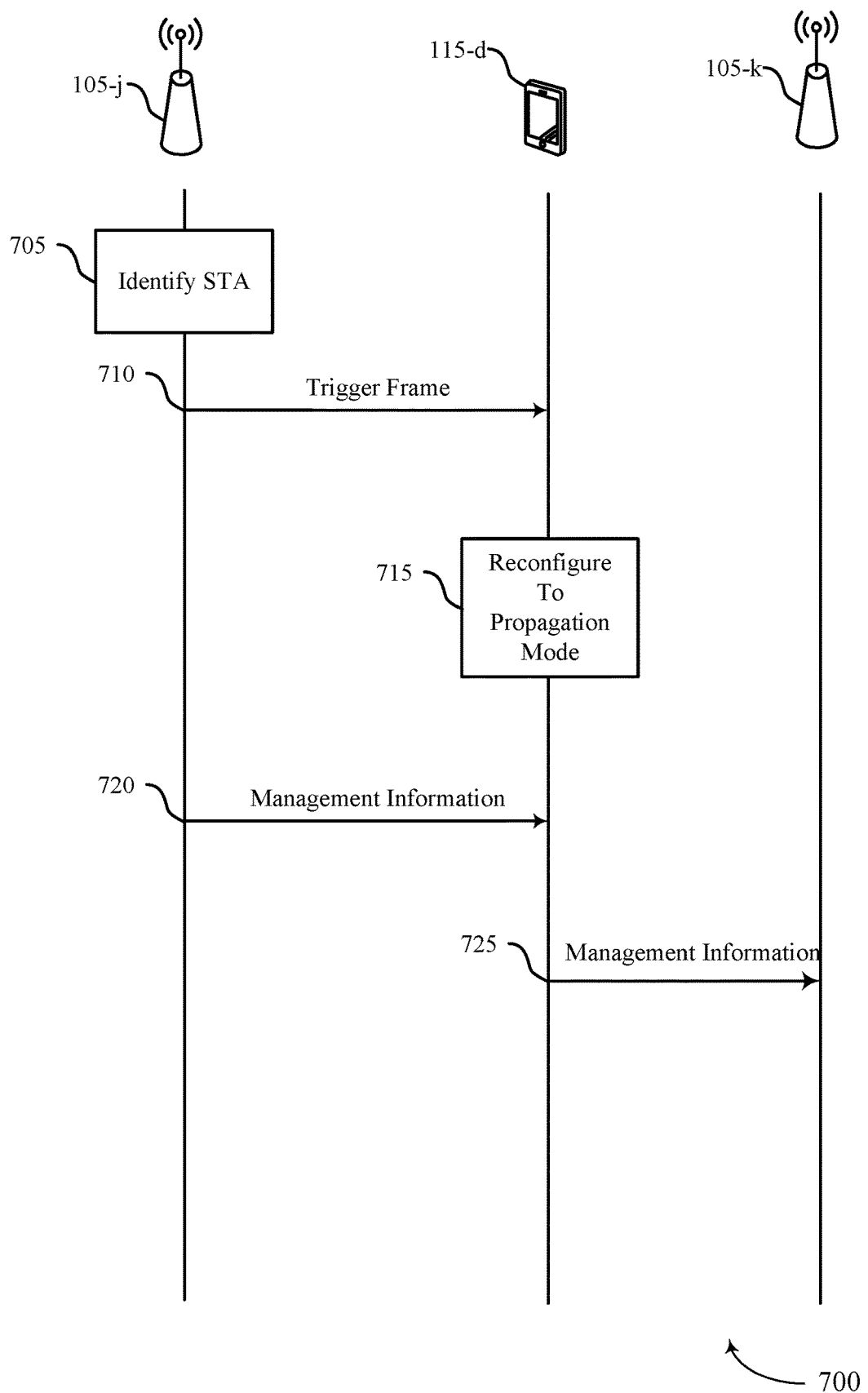
FIG. 7 illustrates an example of a process flow that supports scanning enhancements for next generation Wi-Fi channels in accordance with aspects of the present disclosure.

Procedures for active and passive scanning utilizing discovery channels is described in greater detail with respect to FIGS. 5-7.

FIG. 5 illustrates an example of a process flow 500 that supports scanning enhancements for next generation Wi-Fi in greenfield channels in accordance with aspects of the present disclosure. In some examples, process flow 500 may implement aspects of WLAN 100. Process flow 500 may include an AP 105 and a STA 115-*a*, which may be examples of the corresponding devices described with reference to FIGS. 1 and 2.

In some examples, a STA 115-*b* may perform association procedures using an active scanning mode. At 505-*a*, STA 115-*b* may identify a subset of discovery channels from a set of available channels. Similarly, at 505-*a* and 505-*b* APs 105-*f* and 105-*g* may identify the discovery channels for transmitting and receiving discovery and association signaling. In some examples, STA 115-*b* and APs 105-*f* and 105-*g* may select a discovery channel from the subset of discovery channels for discovery and association signaling. The discovery channel may be located within a BSS operating bandwidth for the AP 105, as discussed in greater detail with respect to FIG. 4.

At 510, STA 115-*b* may transmit a probe request. In some examples, the probe request may be broadcast. In such examples, AP 105-*g* may receive probe request 510 and AP 105-*f* may receive the same probe request at 515. STA 115-*b* may transmit the probe request on the discovery channel identified at 505-*c*. Non-discovery channels may be reserved for post-association signaling at 555. In some examples, STA 115-*b* may wait for the expiration of a minimum channel time for transmitting a probe request on the discovery channel before transmitting the probe request at 510. In some examples, the minimum channel time may be configured by AP 105-*g* or may be preconfigured and known at STA 115-*b*. In some cases, the minimum channel time may be different for each discovery channel.

During discovery procedures, one or more APs 105 such as AP 105-*f* or AP 105-*g* may transmit an indication to a STA 115 such as STA 115-*b*. The indication may be included in probe response 525. The indication may indicate to STA 115-*b* whether pre association signaling is permitted on the 6 GHz band. The indication may indicate whether post-association signaling is permitted on the 6 GHz band. In some examples, a bit or a field of a downlink signal (e.g., a probe response at 525) may carry the indication. The bit or field may indicate that STA 115-*b* is permitted to transmit management frames to AP 105-*g* in a pre-association state. Similarly, a bit or field of the downlink signal (e.g., a probe response at 525 or an association response at 540) may indicate a post-association mode of access. The post-association mode of access may indicate whether access is AP 105 controlled and EDCA based access is not permitted. That is, the indication of a mode of access may indicate whether STA 115-*b* is allowed perform EDCA based access or whether it must wait for AP 105-*g* to allow access.

In some examples, an AP 105-*g* may indicate a restricted-access mode including times during which STA 115-*b* may be permitted to access the 6 GHz band. For example, in a pre-association case or a post-association case, EDCA based access may be permitted during some time-windows and not permitted during other time-windows. In some examples, STA 115-*b* may be expected to be awake and access may be controlled by AP 105-*g*. During other time-windows, STA 115-*b* may enter an idle mode (e.g., a sleep mode or a doze mode) and may not perform any access procedures (e.g., no EDCA based access and no restricted or controlled access). In some examples, indications of the access mode may be included in a downlink signal, such as a probe response at 525 or an association response at 540. In some examples, STA 115-*b* and AP 105-*g* may be preconfigured to satisfy a particular access mode.

In some examples, a discovery frame sent on the discovery channel (e.g., a FILS discovery frame at 620 or 640) may include a maximum transmit power. In some examples, the discovery frame may be a FILS discovery frame, a broadcast probe response, or a beacon frame. The maximum transmit power may be based on (e.g., may satisfy) one or more regulatory requirements. The maximum transmit power may be transmitted to a STA 115-*c* for pre-association and post-association cases.

In some examples, AP 105-*g* may receive a discovery frame and determine whether to associate with the AP 105-*g*. For instance, the discovery frame could be an unsolicited FD frame, or a broadcast beacon frame, as described in greater detail with respect to FIG. 6. In a non-limiting illustrative example shown with respect to FIG. 6, AP 105-*g* may receive a probe request at 510, and may transmit a probe response at 525. In some examples, STA 115-*b* may receive the probe response at 525 and may determine whether to associate with AP 105-*g* based at least in part on the received probe response. In some examples, the STA 115-*b* may determine not to associate with AP 105-*g* after receiving the probe response at 525. In such cases, STA 115-*b* may not have expended too much power or overly congested the 6 GHz band prior to discovering AP 105-*g* by using the discovery channel. However, in other cases, STA 115-*b* may transmit the association request at 535 based on the probe response at 525.

The probe response may include a neighbor AP 105 report, including discovery information for all neighbor APs 105 that AP 105-*g* is aware of, including both APs 105 operating within the BSS bandwidth and without the BSS bandwidth. In such examples, the probe request at 525 may include a neighbor AP 105 report indicating discovery information for AP 105-*f*. The probe response may be in response to the probe request received at 510, and may include discovery information. AP 105-*g* may transmit the probe response on one of the discovery channels at 505-*c*. Upon receive the probe response at 525, STA 115-*b* may determine whether to associate with the AP 105-*g*. In some cases, STA 115-*b* may transmit an association request at 535. AP 105-*g* may receive the association request at 535 and may transmit an association response at 540. Both the association request and the association response may be transmitted over the discovery channel. Such procedures may be performed, for example, by a STA 115-*b* that is an HE STA 115.

At 545, AP 105-*g* may associate with STA 115-*b*, and at 550 STA 115-*b* may associate with AP 105-*g* based on the association request and the association response and the discovery channel. At 555, STA 115-*b* and AP 105-*g* may perform post-association operations (e.g., transmitting data traffic).

In some examples, STA 115-*b* may be an EHT STA 115. In such examples, STA 115-*b* may transmit the probe request at 510 without waiting for the expiration of the minimum channel time (e.g., STAs 115 may be permitted to send probe requests earlier than the minimum channel time). AP 105-*g* may transmit the probe response at 525 within the minimum channel time. In some examples, the probe request transmitted at 510 and 515 may be broadcast. The probe request may contain a minimal information element set. The minimal information element set may contain just enough information to query APs 105.

In some examples, the probe response may be an orthogonal frequency-division multiple access (OFDMA) frame transmitted over a resource unit (RU). That is, both AP 105-*g* and AP 105-*f* may receive the probe request at 510 and at 515, respectively. Both may prepare to response by randomly selecting an RU. The RU may be selected from a timing within the minimum channel time for the discovery channel. Both AP 105-f and AP 105-g may generate a PPDU for transmitting a probe response. AP 105-f and AP 105-g may transmit their respective PPDU over the randomly selected RU, which may then contain a FILS discovery frame and a probe response. The randomly selected RU may carry the FILS discovery frame, and may be located on a sub-channel of the discovery channel. In some cases, the probe response may be located on a different sub-channel. STA 115-b may thus receive a probe response from AP 105-g at 525 and a probe response from AP 105-f at 530.

In another example, both AP 105-g and AP 105-f may receive the probe request at 510 and at 515, respectively, and may generate an acknowledgment (ACK) signal. For instance, AP 105-g may transmit an ACK signal at 520 in response to the probe request at 510. Upon receiving the ACK signal, STA 115-b may refrain from transmitting or suppress transmission of any subsequent probe request for the duration of the minimum channel time. During the time period during which no subsequent probe requests are transmitted, STA 115-b may wait for a response from any APs 105 that have received the probe request (e.g., AP 105-f and AP 105-g). That is, STA 115-b may wait for the minimum channel time to provide APs 105 sufficient time to respond to the probe request.

Each AP 105 may monitor the discovery channel for probe responses, including neighbor AP 105 reports, that correspond to a received probe request. For instance, AP 105-f may receive the probe request at 515. AP 105-f may be capable of transmitting a probe response at 530. However, AP 105-f may monitor the discovery channel to determine if another AP 105 has already responded to STA 115-b and has included an AP 105 neighbor report in the probe response. In an illustrative example, AP 105-g may transmit a probe response including a neighbor AP 105 report at 525. The neighbor AP 105 report may include discovery information for AP 105-f. AP 105-f may detect the probe response at 525, determine that the neighbor AP 105 report includes discovery information for AP 105-f, and may refrain from transmitting a probe response at 530. In some examples, AP 105-f and AP 105-g may be part of the same enterprise deployment, and cross AP 105 coordination may be based at least in part on the enterprise deployment. In some examples, AP 105-f may identify a number of APs 105 that include a neighbor AP 105 report. If the number of APs 105 that include a neighbor AP 105 report exceeds a threshold, and if the number of neighbor AP 105 reports that include discovery information for AP 105-f exceed a second threshold (e.g., if at least one out of N neighbor AP 105 reports includes discovery information for AP 105-f) then AP 105-f may refrain from transmitting a FILS discovery frame.

STA 115-b may receive the probe response at 525, and may receive the discovery information for AP 105-f as well. However, if AP 105-f does not detect a neighbor AP 105 report, or if AP 105-f detects a neighbor AP 105 report but it does not include discovery information for AP 105-f, then AP 105-f will transmit a probe response at 530. Similarly, if AP 105-g detects the probe response (including a neighbor AP 105 report with discovery information for AP 105-g) at 530 prior to transmitting the probe response at 525, then AP 105-g may refrain from transmitting the probe response at 525. In some examples, transmitting a probe response at 525 or a probe response at 530 may occur during the minimum channel time after the ACK signal at 520. In some examples, the probe response may include an indication of whether the probe response is an OFDMA frame or an ACK signal.

Procedures for passing scanning utilizing discovery channels is further described with respect to FIG. 6.

FIG. 6 illustrates an example of a process flow 600 that supports scanning enhancements for next generation Wi-Fi in greenfield channels in accordance with aspects of the present disclosure. In some examples, process flow 600 may implement aspects of WLAN 100. Process flow 600 may include an AP 105 and a STA 115-a, which may be examples of the corresponding devices described with reference to FIGS. 1 and 2.

In some examples, a STA 115-c may perform association procedures using a passive scanning mode. At 605-a, STA 115-c may identify a subset of discovery channels from a set of available channels. Similarly, at 605-a and 605-b APs 105-h and 105-i may identify the discovery channels for transmitting and receiving discovery and association signaling. In some examples, STA 115-b and APs 105-h and 105-i may select a discovery channel from the subset of discovery channels for discovery and association signaling. The discovery channel may be located within a BSS operating bandwidth for the AP 105, as discussed in greater detail with respect to FIG. 4.

At 610, AP 105-I may generate a discovery frame. In some examples, the discovery frame may be a FILS discovery frame, a broadcast probe response, or a beacon frame. In an illustrative and non-limiting example shown in FIG. 6, the discovery frame may be a fast initial link setup (FILS) discovery frame for transmission on the discovery channel. The FILS discovery frame may be included in a management frame that is already scheduled for delivery, such as a beacon frame.

At 615, STA 115-c may scan the discovery channel for a minimum channel time. After the minimum channel time, STA 115-c may determine whether to stay on a channel, wait for a beacon or another beacon, or move to another channel.

At 620, AP 105-i may transmit the FILS discovery frame. In some examples, AP 105-i may transmit the FILS discovery frame as part of a periodic beacon. AP 105-i may transmit the beacon periodically at a first time 620, at a second time 640, and so forth. Passive scanning may rely on management frames, which may be sent in beacon signals ever target beacon transmission time (TBTT). FILS discovery frames may be transmitted every TBTT. AP 105-i may occasionally broadcast a probe response. In such cases, STA 115-c may receive the beacon including the FILS discovery frame at 620. STA 115-c may determine, based at least in part on a set of channel access rules, to associate with AP 105-I, and may transmit an association request at 645. AP 105-i may receive the association request at 645 and may transmit the association response at 650. In some examples, the association request and the association response may be transmitted over the discovery channel. AP 105-i may association with STA 115-c at 655, and at 660 STA 115-c may associate with AP 105-i. Periodic generation and transmission of management frames may be done at long intervals to increase scanning times. This may impact discovery latency, roaming, and the like. Short intervals may reduce system efficiency (e.g., may occupy hundreds of microseconds of airtime). Scanning may be enhanced by reducing airtime occupied by scanning and reducing transmit intervals. STA 115-c may perform baseline passive scanning. STA 115-c may scan for beacons, FILS discovery frames, and probe responses, but any of these signals may include only IEs that are necessary for discovery. AP 105-I may remove any obsolete IEs and use inheritance rules in transmitting a discovery frame, a probe response, or a beacon.

During discovery procedures, one or more APs 105 such as AP 105-h or AP 105-i may transmit an indication to a STA 115 such as STA 115-c. The indication may be included in a FILS discovery frame at 620 or 640. The indication may indicate to STA 115-*c* whether pre association signaling is permitted on the 6 GHz band. The indication may indicate whether post-association signaling is permitted on the 6 GHz band. In some examples, a bit or a field of a downlink signal (e.g., a FILS discovery frame at 620 or 640) may carry the indication. The bit or field may indicate that STA 115-*c* is permitted to transmit management frames to AP 105-*i* in a pre-association state. Similarly, a bit or field of the downlink signal (e.g., a FILS discovery frame at 620 or 640) may indicate a post-association mode of access. The post-association mode of access may indicate that access is AP 105 controlled and EDCA based access is not permitted, or that EDCA based access is permitted and that access is not controlled by an AP 105. That is, the indication of a mode of access may indicate whether STA 115-*c* is allowed perform EDCA based access or whether it must wait for AP 105-*i* to allow access.

In some examples, an AP 105-*i* may indicate a restricted-access mode including times during which STA 115-*c* may be permitted to access the 6 GHz band. For example, in a pre-association case or a post-association case, EDCA based access may be permitted during some time-windows and not permitted during other time-windows. In some examples, STA 115-*c* may be expected to be awake and access may be controlled by AP 105-*i*. During other time-windows, STA 115-*c* may enter an idle mode (e.g., a sleep mode or a doze mode) and may not perform any access procedures (e.g., no EDCA based access and no restricted or controlled access). In some examples, indications of the access mode may be included in a downlink signal, such as a FILS discovery frame at 620 or 640. In some examples, STA 115-*c* and AP 105-*i* may be preconfigured to satisfy a particular access mode.

In some examples, the discovery frames also carry one or more access rules. For example, the access rules may indicate whether or not the STA 115 is allowed to send frames (e.g., a probe request or an association request) to the AP 105 on the 6G band. Based on this information (and the mechanism advertised by the AP 105 in the discovery frame), the STA 115 would either send request frames on the 6 GHz band (e.g., when EDCA based access is allowed) or exchange frames on another band or channel (e.g., a 2.4 GHz band or a 5 GHz band) or wait for a trigger frame with random access resource units on the 6 GHz band (if EDCA based access is disabled on the 6 GHz band). Also, in some examples, STAs 115 may decide to pick an AP 105 based at least in part on the kind of access the AP permits (e.g., post association access rules).

In some examples, a FILS discovery frame at 620 or 640 may include a maximum transmit power. The maximum transmit power may be based on (e.g., may satisfy) one or more regulatory requirements. The maximum transmit power may be transmitted to a STA 115-*c* for pre-association and post-association cases.

To improve coordination and system efficiency, strict rules for coordination between APs 105 may be implemented. For instance, AP 105-*i* may include a message integrity check (MIC) in a management frame, and may transmit the management frame to another AP 105 or to a STA 115-*c*. As described in greater detail below, an AP 105 may be required to include a neighbor AP 105 report including discovery information for neighbor APs 105 in transmitted frames, such as probe responses or beacons. A neighbor AP 105 report may include IEs that satisfy inheritance rules. Additionally, or alternatively, the generation frequency of management frames (e.g., the frequency of generated FILS discovery frames such as those transmitted at 620 and 640) may be determined based at least in part on the number of APs 105 that include discovery information for an AP 105 in a neighbor AP 105 report. That is, the frequency with which AP 105-*i* generates and transmits management frames may be proportional to the number of neighbor APs 105 (e.g., AP 105-*h*) that include discovery information for AP 105-I in their neighbor AP 105 reports.

In some examples, AP 105-*i* or AP 105-*h* may transmit a FILS discovery frame in an event-based manner. For instance, AP 105-*i* may be operating in a passive scanning mode, transmitting a beacon periodically. STA 115-*c* may be operating in an active scanning mode, and may transmit a probe request at 625. In some examples, the probe request may be broadcast, and received by AP 105-I at 625 and by AP 105-*h* at 630. The probe request may trigger all receiving APs 105 to generate a probe response. In some examples, AP 105-*i* may transmit the FILS discovery frame at 640 in response to the probe request received at 625. AP 105-*i* may include the FILS discovery frame in response to the probe request at a previously scheduled time (e.g., may include discovery information for STA 115-*c* in a previously scheduled periodic beacon). In some examples, AP 105-*i* may transmit a probe response to STA 115-*c* in response to the probe request received at 625 regardless of whether the timing of the probe response corresponds to a periodic timing of transmitted beacons.

To decrease system congestion, an AP 105 that detects a neighbor AP 105 report being transmitted to a STA 115 in response to a probe request may suppress transmission of a probe request. For instance, AP 105-*i* may be operating in a passive scanning mode, and may transmit a FILS discovery frame periodically over the discovery channel. AP 105-*i* may receive a probe request at 625, which may trigger a probe response from AP 105-*i* and any other receiving AP 105. AP 105-*i* may monitor the discovery channel to detect a probe response from another AP 105. In some cases, AP 105-*h* may receive the broadcast probe request at 630, and may transmit a probe response at 635. The probe response may include a neighbor AP 105 report, which may include discovery information for AP 105-*i* and any other known AP 105. AP 105-*i* may detect the neighbor report included in the probe response from AP 105-*h* at 635 and may determine that it includes discovery information for AP 105-*i*. In such instances, AP 105-*i* may refrain from transmitting a probe response including the FILS discovery frame at 640.

In some examples, a PPDU may carry some BSS information. Block (ACK) frames may be generated frequently. IN some examples, BSS information may be hidden in a service field of such frames (e.g., in one or more of 8 most significant bits (MSBs) of the service field). In some examples, a new control response frame may be generated to carry BSS information. HE or next generation PPDUs may use BSS colors obtained as hashes of service set identifier (SSID), basic service set identifier (BSSID), other identifiers, or the like. In some examples, 9 reserved bits of an HE trigger-based (TB) PPDU for carrying the SSID hash may be used to carry BSS information. In some cases, it may be possible to rotate the hash SSIDs indicated in a message to a receiving STA 115. Information indicating the next TBTT may also be included in signaling such as management frames (e.g., BSS information signaling or block ACK frames). For instance, a management frame may include to target time at which an AP 105 intends to provide full BSS information (e.g., in a beacon, a FILS, or the like).

FIG. 7 illustrates an example of a process flow 700 that supports scanning enhancements for next generation Wi-Fi in greenfield channels in accordance with aspects of the present disclosure. In some examples, process flow 700 may implement aspects of WLAN 100. may implement aspects of WLAN 100 and may include AP 105-a and STA 115-a, which may be examples of the corresponding devices described with reference to FIG. 1. Process flow 700 may include an AP 105 and a STA 115-a, which may be examples of the corresponding devices described with reference to FIGS. 1 and 2.

In some examples, a STA 115-d may be an EHT STA 115. STA 115-d may operate, for example, in a passive scanning mode, as described in greater detail with respect to FIG. 6. In some examples, AP 105-j may delegate STA 115-d to propagate information. For instance, AP 105-j and AP 105-k may not be able to communicate with each other (e.g., neither AP 105 may be located within the geographic coverage area of the other AP 105). However, both AP 105-j and AP 105-k may be able to communicate with STA 115-d. As described above, to improve coordination and system efficiency, strict rules for coordination between APs 105 may be implemented. An AP 105 may be required to include a neighbor AP 105 report including discovery information for neighbor APs 105 in transmitted frames, such as probe responses or beacons. In some examples, the generation frequency of management frames (e.g., the frequency of generated FILS discovery frames) may be determined based at least in part on the number of APs 105 that include discovery information for an AP 105 in a neighbor AP 105 report. That is, the frequency with which AP 105-i generates and transmits management frames may be proportional to the number of neighbor APs 105 (e.g., AP 105-h) that include discovery information for AP 105-I in their neighbor AP 105 reports.

In these and other cases, an AP 105-j may transmit information including neighbor AP 105 reports, and other information (e.g., scanning information, BSS limitations, requirements, and the like) to other APs to improve coordination and system efficiency. However, in some examples, one or more APs 105 (e.g., AP 105-k) may be unable to communicate with AP 105-j. In such examples, AP 105-j may identify a STA 115-d that is in communication with AP 105-j and with AP 105-k at 705. AP 105-j may configure STA 115-d to serve as a propagating STA 115-d. In some examples, AP 105-j may transmit a trigger frame to STA 115-d at 710. The trigger frame may initially configure the STA 115-d as a propagating STA 115. In some examples, the STA 115-d may be previously configured to operate in a propagation mode, but the propagation mode may be off. That is, the trigger frame may turn on a previously configured propagation mode so that the STA 115-d knows to expect management information at 720. In such examples, STA 115-d may be preconfigured with a propagation mode, or may be configured by STA 115-j previously during a handover procedure, an association procedure, or other signaling.

At 720, AP 105-j may transmit management information to STA 115-d for propagation to AP 105-k. Management information may include neighbor AP 105 reports, scanning information, BSS limitations, requirements, and other management information. At 725, STA 115-d may propagate the management information to AP 105-k. AP 105-j and AP 105-k, may utilize propagated management information to improve neighbor AP 105 reports, determine a frequency for generating management frames, and may take other actions to improve system efficiency.

Figure 8:
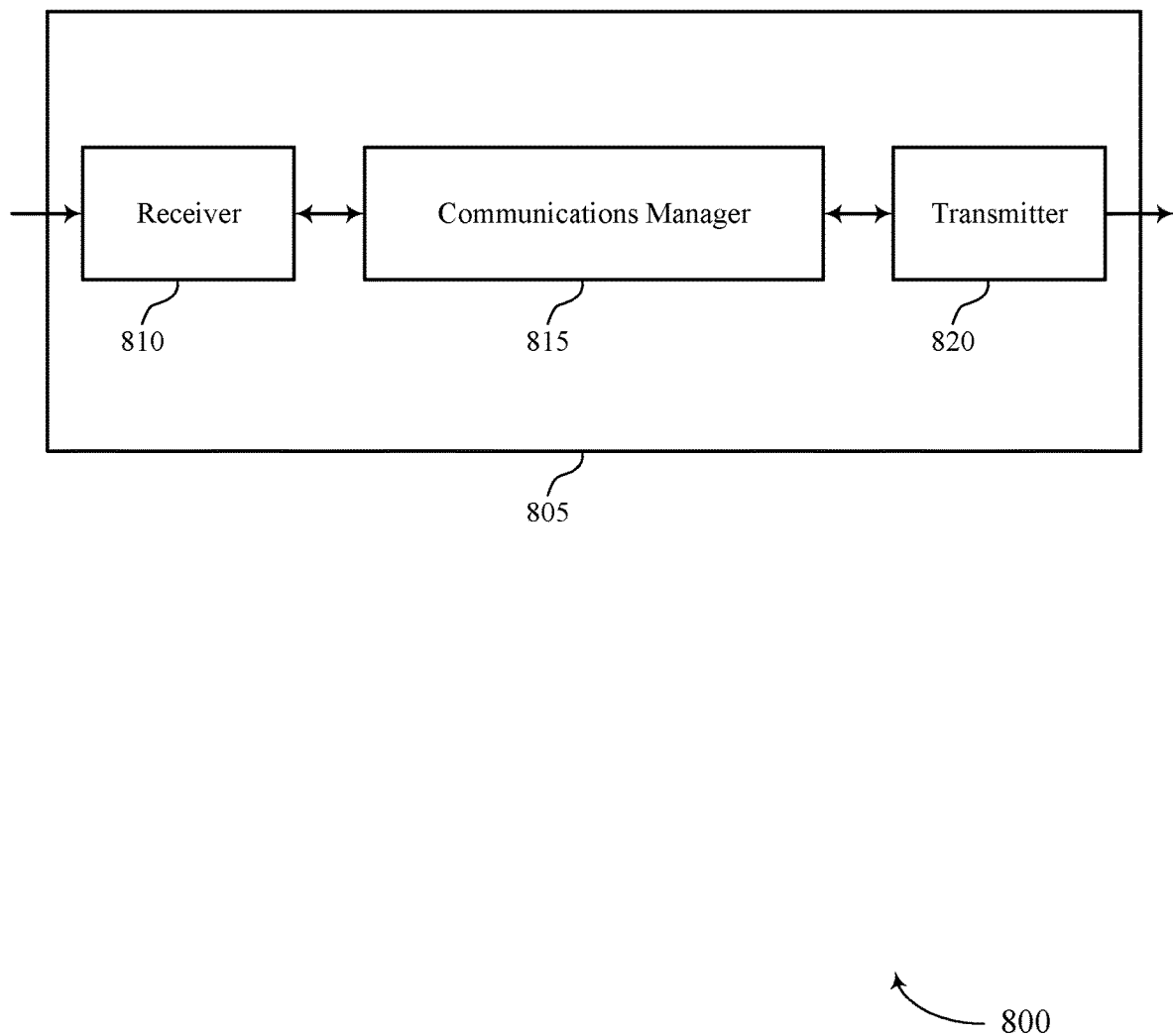
FIGS. 8 and 9 show block diagrams of devices that support scanning enhancements for next generation Wi-Fi channels in accordance with aspects of the present disclosure.

FIG. 8 shows a block diagram 800 of a device 805 that supports scanning enhancements for next generation Wi-Fi in greenfield channels in accordance with aspects of the present disclosure. The device 805 may be an example of aspects of an AP as described herein. The device 805 may include a receiver 810, a communications manager 815, and a transmitter 820. The device 805 may also include a processor. Each of these components may be in communication with one another (e.g., via one or more buses). In some examples, communications manager 815 may be implemented by a modem. Communications manager 815 may communicate with transmitter 820 via a first interface. Communications manager 815 may output signals for transmission via the first interface. Communications manager 815 may interface with receiver 810 via a second interface. Communications manager 815 obtain signals (e.g., transmitted from an AP 105) via the second interface. In some examples, the modem may implement, via the first interface and the second interface, the techniques and methods described herein. Such techniques may result in improved efficiency, increased computational resources, longer-lasting battery at the device, and overall system efficiency. Implementing the described techniques by the modem may avoid channel pollution from multiple STAs, system latency, and excessive power expenditure at a STA, resulting in increased battery life and improved user experience.

The receiver 810 may receive information such as packets, user data, or control information associated with various information channels (e.g., control channels, data channels, and information related to scanning enhancements for next generation Wi-Fi in greenfield channels, etc.). Information may be passed on to other components of the device. The receiver 810 may be an example of aspects of the transceiver 1120 described with reference to FIG. 11. The receiver 810 may utilize a single antenna or a set of antennas.

The communications manager 815 may identify, from a set of channels in a radio frequency spectrum band, a subset of discovery channels designated for discovery signaling for device association, transmit discovery information to a STA for determining one or more channel access rules or whether to associate with the AP over a discovery channel from the identified subset of discovery channels, receive an association request from a station based on the discovery information transmitted over the discovery channel, and associate with the station based on the association request and the discovery channel. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
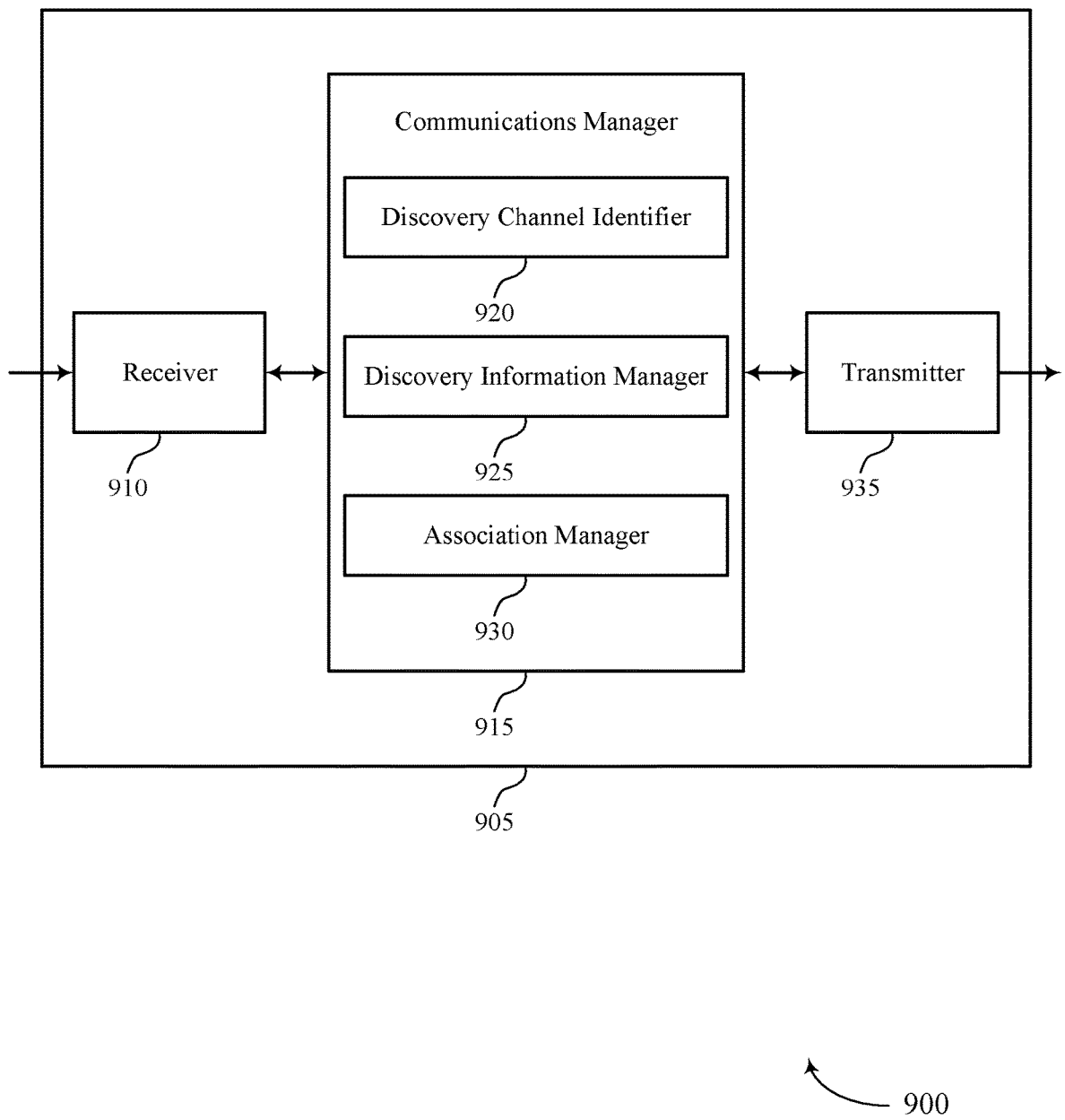

FIG. 9 shows a block diagram 900 of a device 905 that supports scanning enhancements for next generation Wi-Fi in greenfield channels in accordance with aspects of the present disclosure. The device 905 may be an example of aspects of a device 805 or a STA 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to scanning enhancements for next generation Wi-Fi in greenfield channels, etc.). Information may be passed on to other components of the device. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a discovery channel identifier 920, a discovery information manager 925, and an association manager 930. The communications manager 915 may be an example of aspects of the communications manager 1110 described herein.

The discovery channel identifier 920 may identify, from a set of channels in a radio frequency spectrum band, a subset of discovery channels designated for discovery signaling for device association. The discovery information manager 925 may transmit discovery information to a STA for determining one or more channel access rules or whether to associate with the AP over a discovery channel from the identified subset of discovery channels. Discovery information manager 925 may identify a restricted access mode based at least in part on the one or more channel access rules; determine that an unsolicited management frame is not permitted on the radio frequency spectrum band based at least in part on the restricted access mode; and wait to receive a random access resource unit (RU) from the station or transmitting a probe request on a second radio frequency spectrum band based at least in part on the restricted access mode The association manager 930 may receive an association request from a station based on the discovery information transmitted over the discovery channel and associate with the station based on the association request and the discovery channel.

The transmitter 935 may transmit signals generated by other components of the device. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
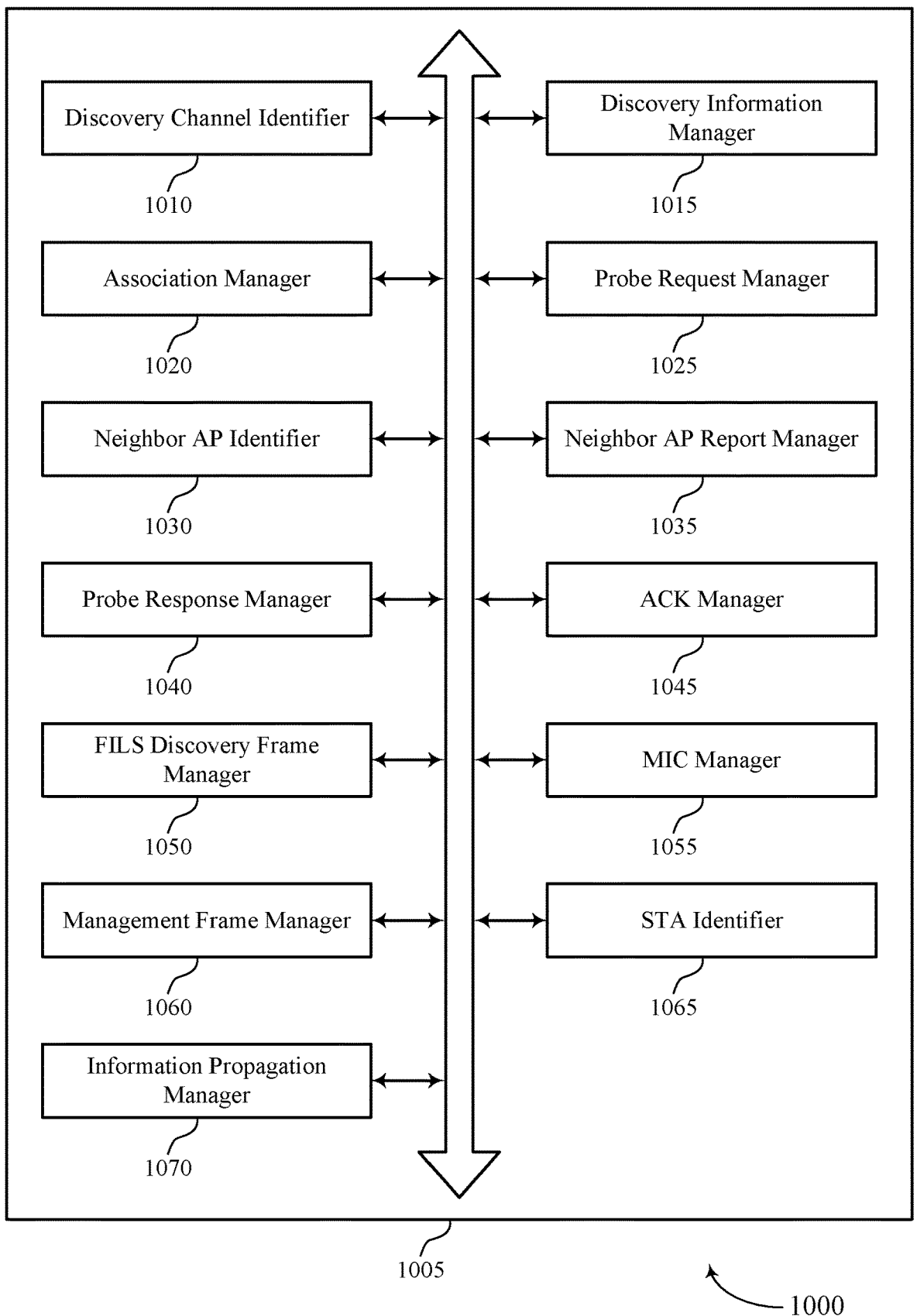
FIG. 10 shows a block diagram of a communications manager that supports scanning enhancements for next generation Wi-Fi channels in accordance with aspects of the present disclosure.

FIG. 10 shows a block diagram 1000 of a communications manager 1005 that supports scanning enhancements for next generation Wi-Fi in greenfield channels in accordance with aspects of the present disclosure. The communications manager 1005 may be an example of aspects of a communications manager 815, a communications manager 915, or a communications manager 1110 described herein. The communications manager 1005 may include a discovery channel identifier 1010, a discovery information manager 1015, an association manager 1020, a probe request manager 1025, a neighbor AP identifier 1030, a neighbor AP report manager 1035, a probe response manager 1040, an ACK manager 1045, a FILS discovery frame manager 1050, a MIC manager 1055, a management frame manager 1060, a STA identifier 1065, and an information propagation manager 1070. Each of these modules may communicate, directly or indirectly, with one another (e.g., via one or more buses).

The discovery channel identifier 1010 may identify, from a set of channels in a radio frequency spectrum band, a subset of discovery channels designated for discovery signaling for device association.

In some cases, the subset of discovery channels includes a set of contiguous channels of the set of channels.

In some cases, the subset of discovery channels includes a set of non-contiguous channels having a non-unitary periodicity.

The discovery information manager 1015 may transmit discovery information to a STA for determining one or more channel access rules or whether to associate with the AP over a discovery channel from the identified subset of discovery channels.

The association manager 1020 may receive an association request from a station based on the discovery information transmitted over the discovery channel. In some examples, the association manager 1020 may associate with the station based on the association request and the discovery channel.

The probe request manager 1025 may receive a probe request from the station, where transmitting the discovery information is based on receiving the probe request, and where the discovery information includes a probe response. In some examples, the probe request manager 1025 may receive a second probe request from the station. In some examples, the probe request manager 1025 may receive a first broadcast probe request from a second station operating in an active scanning mode, where generating the FILS discovery frame and broadcasting the FILS discovery frame are based on the received first broadcast probe request. In some examples, the probe request manager 1025 may receive a second broadcast probe request from the second station. In some examples, the probe request manager 1025 may determine that a number of access points transmitting neighbor access point responses exceeds a threshold number, wherein the probe response including the neighbor access point report from the neighbor access point is one of the identified number of access points, and wherein suppressing transmission of the probe request is based at least in part on the probe response including the neighbor access point report and the determining The neighbor AP identifier 1030 may identify one or more neighbor access points. In some examples, the one or more neighbor access points may be collocated. In some examples, the neighbor AP identifier 1030 may identify a first set of access points within an available bandwidth including the set of channels corresponding to a basic service set (BSS); and identifying a second set of access points that operate outside an available bandwidth including the set of channels corresponding to the BSS, where the neighbor access point report includes both the first set of access points and the second set of access points. In some examples, the neighbor AP identifier 1030 may determine a number of neighbor access points indicated by the neighbor access point report.

The neighbor AP report manager 1035 may include a neighbor access point report indicating the identified one or more neighbor access points in the probe response.

In some examples, the neighbor AP report manager 1035 may detect a probe response including a neighbor access point report from a neighbor access point, the probe response corresponding to the second probe request. In some examples, the neighbor AP report manager 1035 may detect a neighbor access point report transmitted by a second access point.

The probe response manager 1040 may randomly select a time for transmitting the probe response from a minimum channel time for transmission of the probe request on the discovery channel. In some examples, the probe response manager 1040 may randomly select a resource unit (RU) of an orthogonal frequency division multiple access frame. In some examples, the probe response or association response corresponding to an association request is transmitted over the selected resource unit.

In some examples, the probe response manager 1040 may identify a minimum channel time for transmission of the probe response on the discovery channel, where transmitting the probe response is based on the identified minimum channel time. In some examples, the probe response manager 1040 may detect a probe response corresponding to the second probe request transmitted by a neighbor access point.

In some examples, the probe response manager 1040 may suppress transmission of a duplicate probe response corresponding to the second probe request based on the detecting. In some examples, the probe response manager 1040 may suppress transmission of a probe response corresponding to the second broadcast probe response based on the detecting.

The ACK manager 1045 may transmit an ACK signal based on the probe request. In some examples, the ACK manager 1045 may transmit an ACK signal based on the second probe request. The FILS discovery frame manager 1050 may generate a fast initial link setup (FILS) discovery frame. In some examples, the FILS discovery frame manager 1050 may broadcast the FILS discovery frame. In some examples, the FILS discovery frame manager 1050 may randomly select a time from a minimum channel time for transmission of the FILS discovery frame on the discovery channel. In some examples, the FILS discovery frame manager 1050 may identify one or more neighbor access points, and may include a neighbor access point report indicating the identified one or more neighbor access points in the FILS discovery frame.

In some cases, the FILS discovery frame is broadcast periodically.

The MIC manager 1055 may transmit a management frame including a message integrity check (MIC) to a second access point.

The management frame manager 1060 may generate management frames with a periodicity that is based on the number of neighbor access points.

The STA identifier 1065 may identify a station that is located within a geographic coverage area of the access point and is also within a geographic coverage area of a second access point, where the second access point is outside the geographic coverage area of the access point.

The information propagation manager 1070 may configure the identified station to propagate management information to the second access point. In some examples, the information propagation manager 1070 may transmit a trigger frame to the identified station.

Figure 11:
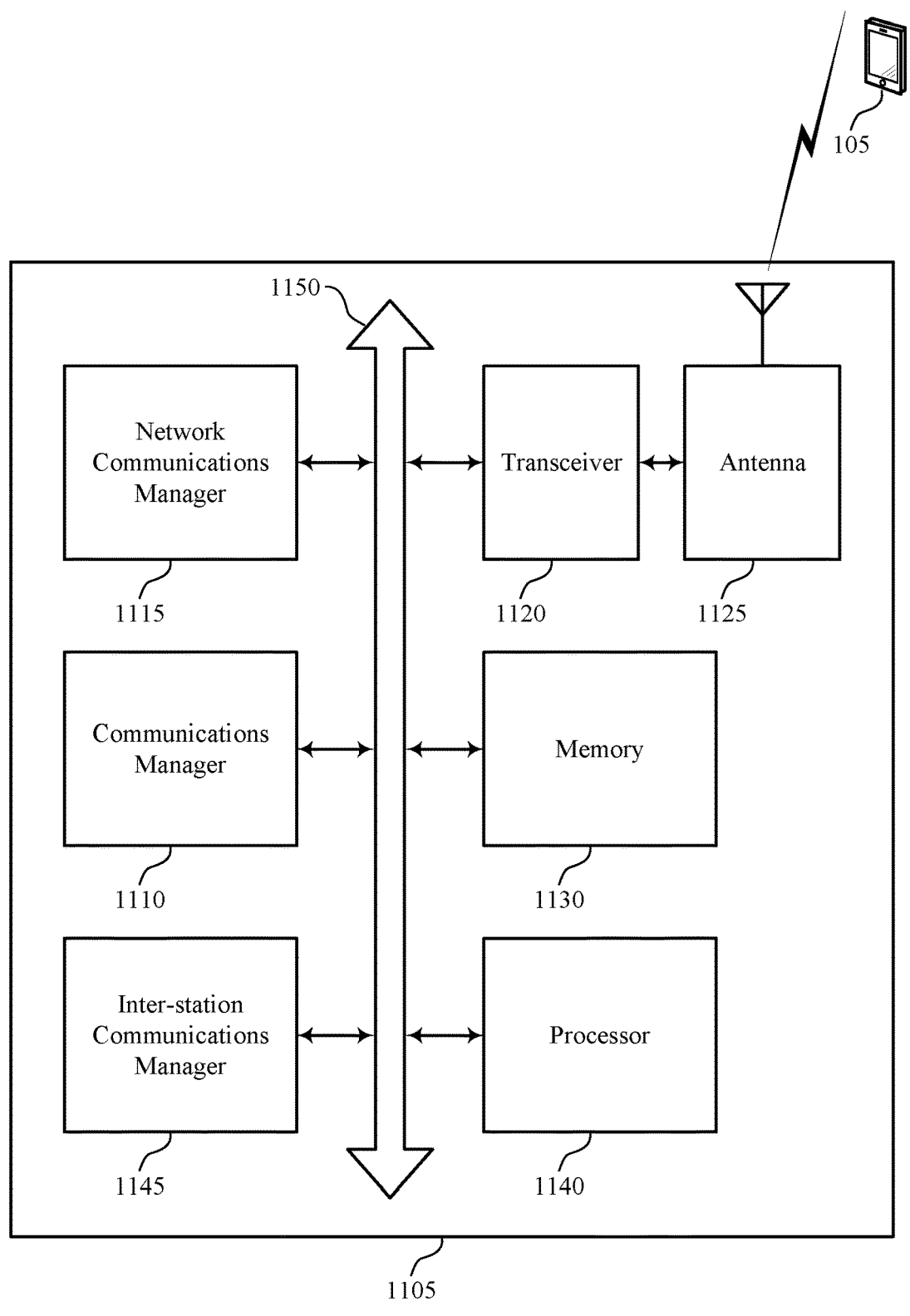
FIG. 11 shows a diagram of a system including a device that supports scanning enhancements for next generation Wi-Fi channels in accordance with aspects of the present disclosure.

FIG. 11 shows a diagram of a system 1100 including a device 1105 that supports scanning enhancements for next generation Wi-Fi in greenfield channels in accordance with aspects of the present disclosure. The device 1105 may be an example of or include the components of device 805, device 905, or a AP as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may identify, from a set of channels in a radio frequency spectrum band, a subset of discovery channels designated for discovery signaling for device association, transmit discovery information to a STA for determining one or more channel access rules or whether to associate with the AP over a discovery channel from the identified subset of discovery channels, receive an association request from a station based on the discovery information transmitted over the discovery channel, and associate with the station based on the association request and the discovery channel.

The network communications manager 1115 may manage communications with the core network (e.g., via one or more wired backhaul links). For example, the network communications manager 1115 may manage the transfer of data communications for client devices, such as one or more STAs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into processor 1140. The processor 1140 may be configured to execute computer-readable instructions stored in a memory to perform various functions (e.g., functions or tasks supporting scanning enhancements for next generation Wi-Fi in greenfield channels).

The inter-station communications manager 1145 may manage communications with other AP 105, and may include a controller or scheduler for controlling communications with STAs 115 in cooperation with other APs 105. For example, the inter-station communications manager 1145 may coordinate scheduling for transmissions to STAs 115 for various interference mitigation techniques such as beamforming or joint transmission. In some examples, the inter-station communications manager 1145 may provide an X2 interface within an LTE/LTE-A wireless communication network technology to provide communication between APs 105.

Figure 12:
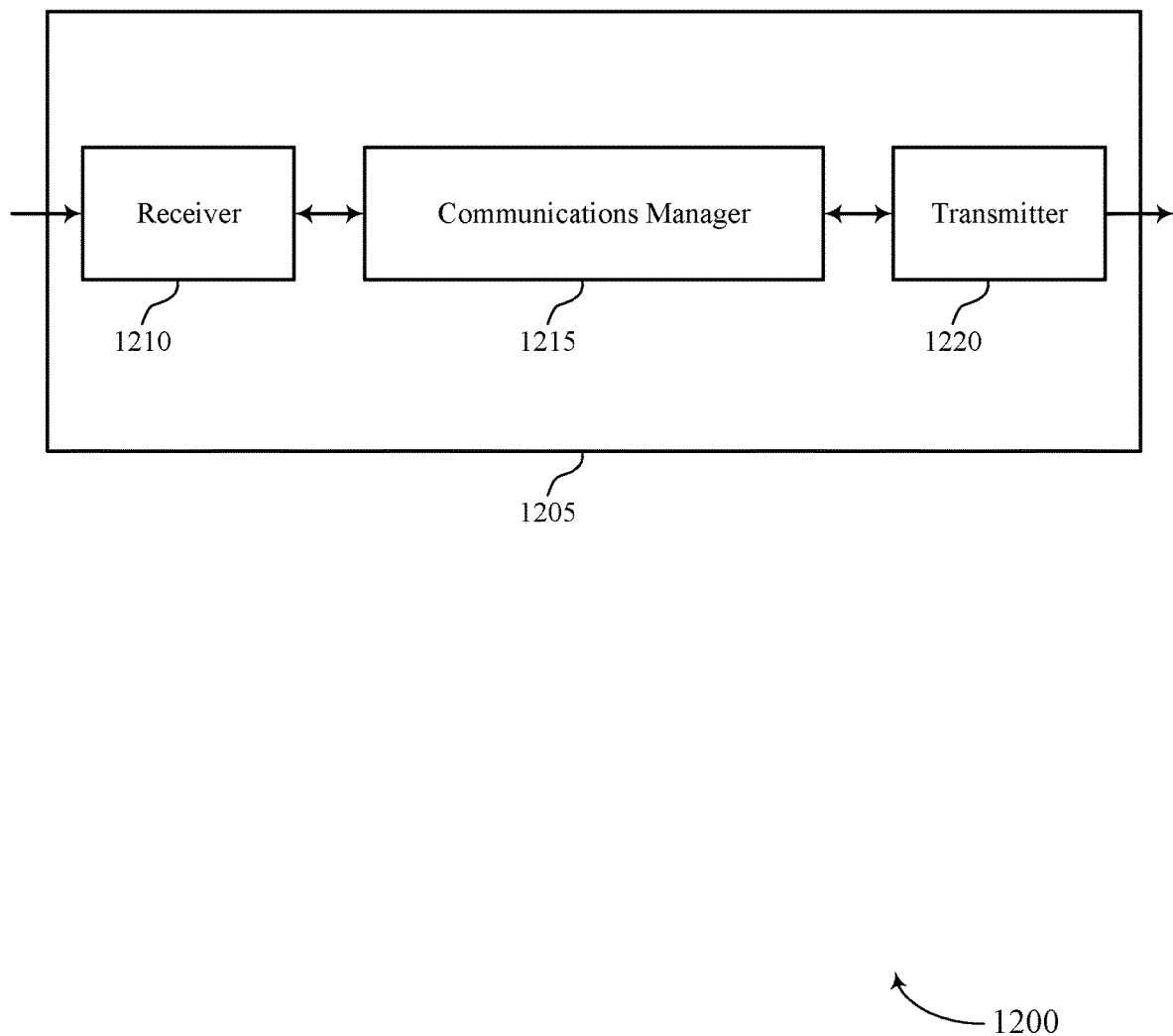
FIGS. 12 and 13 show block diagrams of devices that support scanning enhancements for next generation Wi-Fi channels in accordance with aspects of the present disclosure.

FIG. 12 shows a block diagram 1200 of a device 1205 that supports scanning enhancements for next generation Wi-Fi in greenfield channels in accordance with aspects of the present disclosure. The device 1205 may be an example of aspects of a STA as described herein. The device 1205 may include a receiver 1210, a communications manager 1215, and a transmitter 1220. The device 1205 may also include a processor. Each of these components may be in communication with one another (e.g., via one or more buses). In some examples, communications manager 1215 may be implemented by a modem. Communications manager 1215 may communicate with transmitter 1220 via a first interface. Communications manager 1215 may output signals for transmission via the first interface. Communications manager 1215 may interface with receiver 1210 via a second interface. Communications manager 1215 may obtain signals (e.g., transmitted from a STA 115) via the second interface. In some examples, the modem may implement, via the first interface and the second interface, the techniques and methods described herein. Such techniques may result in improved efficiency, increased computational resources, longer-lasting battery at the device, and overall system efficiency. Implementing the described techniques by the modem may avoid channel pollution from multiple STAs, system latency, and excessive power expenditure at a STA, resulting in increased battery life and improved user experience.

Receiver 1210 may receive information such as packets, user data, or control information associated with various information channels (e.g., control channels, data channels, and information related to scanning enhancements for next generation Wi-Fi in greenfield channels, etc.). Information may be passed on to other components of the device. The receiver 1210 may be an example of aspects of the transceiver 1520 described with reference to FIG. 15. The receiver 1210 may utilize a single antenna or a set of antennas.

The communications manager 1215 may identify, from a set of channels in a radio frequency spectrum band, a subset of discovery channels designated for discovery signaling for device association, receive discovery information from an AP for determining one or more channel access rules or whether to associate with the AP over a discovery channel from the identified subset of discovery channels, transmit an association request to an access point based on the discovery information transmitted over the discovery channel, and associate with the access point based on the association request and the discovery channel. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
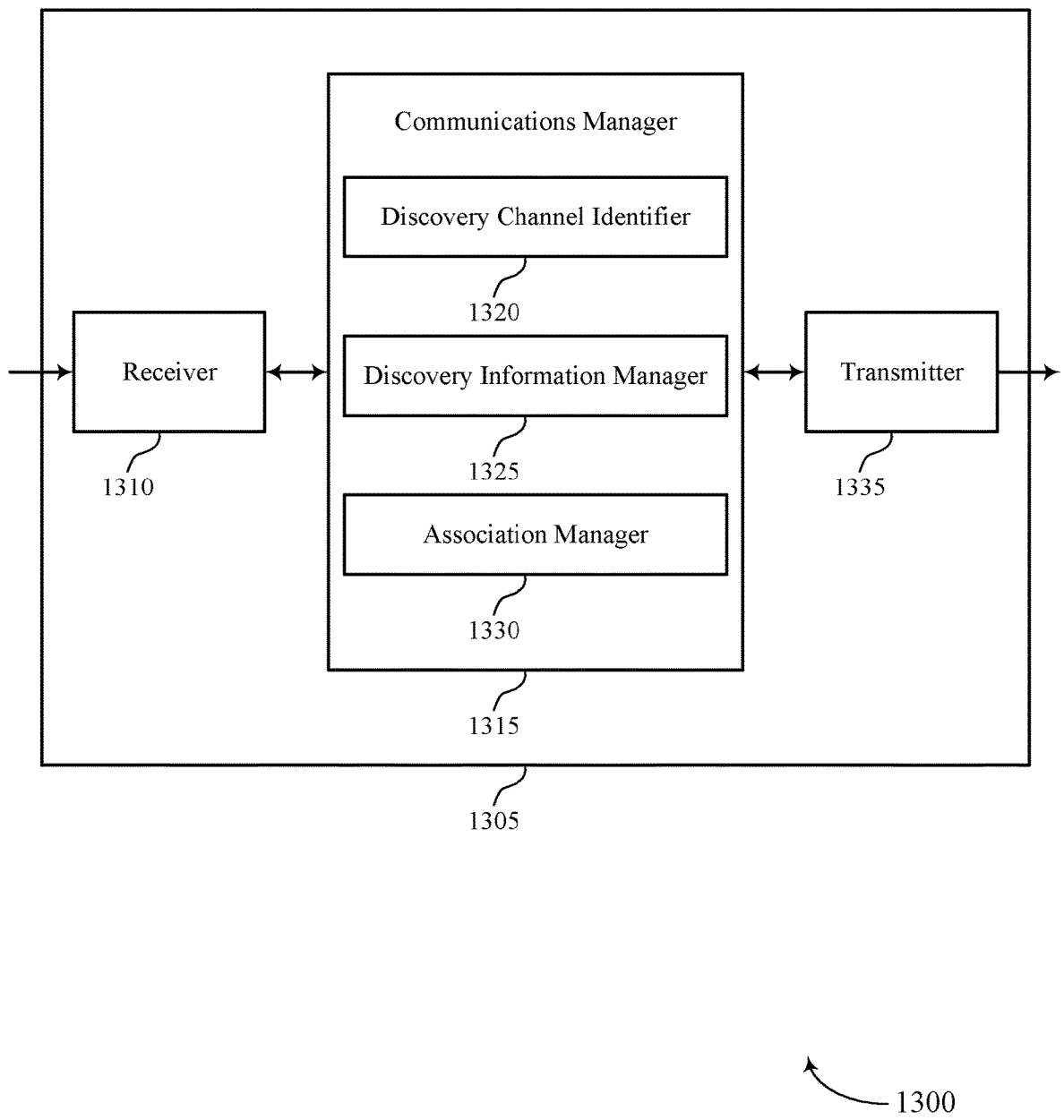

FIG. 13 shows a block diagram 1300 of a device 1305 that supports scanning enhancements for next generation Wi-Fi in greenfield channels in accordance with aspects of the present disclosure. The device 1305 may be an example of aspects of a device 1205 or a STA 115 as described herein. The device 1305 may include a receiver 1310, a communications manager 1315, and a transmitter 1335. The device 1305 may also include a processor. Each of these components may be in communication with one another (e.g., via one or more buses).

Receiver 1310 may receive information such as packets, user data, or control information associated with various information channels (e.g., control channels, data channels, and information related to scanning enhancements for next generation Wi-Fi in greenfield channels, etc.). Information may be passed on to other components of the device. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a discovery channel identifier 1320, a discovery information manager 1325, and an association manager 1330. The communications manager 1315 may be an example of aspects of the communications manager 1510 described herein.

The discovery channel identifier 1320 may identify, from a set of channels in a radio frequency spectrum band, a subset of discovery channels designated for discovery signaling for device association.

The discovery information manager 1325 may receive discovery information from an AP for determining one or more channel access rules or whether to associate with the AP over a discovery channel from the identified subset of discovery channels.

The association manager 1330 may transmit an association request to an access point based on the discovery information transmitted over the discovery channel and associate with the access point based on the association request and the discovery channel.

Transmitter 1335 may transmit signals generated by other components of the device. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
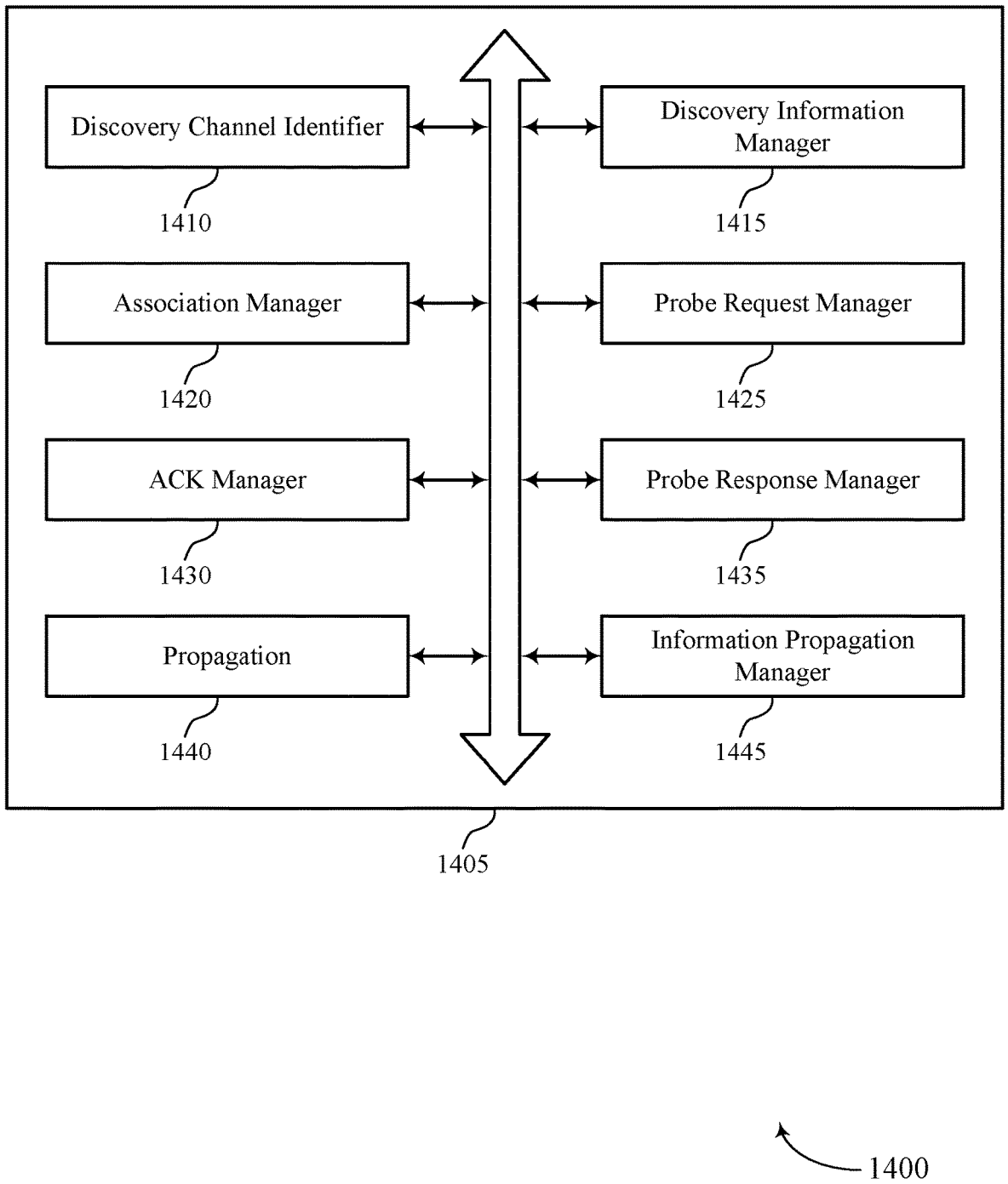
FIG. 14 shows a block diagram of a communications manager that supports scanning enhancements for next generation Wi-Fi channels in accordance with aspects of the present disclosure.

FIG. 14 shows a block diagram 1400 of a communications manager 1405 that supports scanning enhancements for next generation Wi-Fi in greenfield channels in accordance with aspects of the present disclosure. The communications manager 1405 may be an example of aspects of a communications manager 1215, a communications manager 1315, or a communications manager 1510 described herein. The communications manager 1405 may include a discovery channel identifier 1410, a discovery information manager 1415, an association manager 1420, a probe request manager 1425, an ACK manager 1430, a probe response manager 1435, a propagation 1440, and an information propagation manager 1445. Each of these modules may communicate, directly or indirectly, with one another (e.g., via one or more buses).

The discovery channel identifier 1410 may identify, from a set of channels in a radio frequency spectrum band, a subset of discovery channels designated for discovery signaling for device association. In some cases, the subset of discovery channels includes a set of contiguous channels of the set of channels. In some cases, the subset of discovery channels includes a set of non-contiguous channels having a non-unitary periodicity.

The discovery information manager 1415 may receive discovery information from an AP for determining one or more channel access rules or whether to associate with the AP over a discovery channel from the identified subset of discovery channels. In some examples, the discovery information manager 1415 may scan the subset of discovery channels, where receiving the discovery information on the discovery channel is based on the scanning.

The association manager 1420 may transmit an association request to an access point based on the discovery information transmitted over the discovery channel. In some examples, the association manager 1420 may associate with the access point based on the association request and the discovery channel.

The probe request manager 1425 may transmit a probe request to the access point over the discovery channel, where receiving the discovery information is received in a probe response based on the probe request. In some examples, the probe request manager 1425 may refrain from transmitting a second probe request for a minimum channel time for transmitting on the discovery channel. In some examples, identifying a minimum channel time for transmitting the probe request to the access point over the discovery channel includes transmitting the probe request prior to expiration of the minimum channel time. In some examples, the probe request manager 1425 may broadcast the probe request while operating in an active scanning mode.

The ACK manager 1430 may receive an ACK frame based on the probe request. In some cases, the probe response may be an ACK frame or an orthogonal frequency-division multiple access (OFDMA) frame.

The probe response manager 1435 may receive, during the minimum channel time, the probe response. In some examples, receiving the discovery information from an AP for determining one or more channel access rules or whether to associate with an AP includes receiving a probe response from a neighboring access point in response to the probe request, the probe response including a neighbor access point report corresponding to the access point.

The propagation 1440 may receive a propagation configuration message from the access point.

The information propagation manager 1445 may reconfigure a device such as a STA to enter a management information propagation mode. In some examples, the information propagation manager 1445 may receive management information from the access point. In some examples, the information propagation manager 1445 may transmit the management information to a second access point. In some cases, the propagation configuration message includes a trigger frame.

Figure 15:
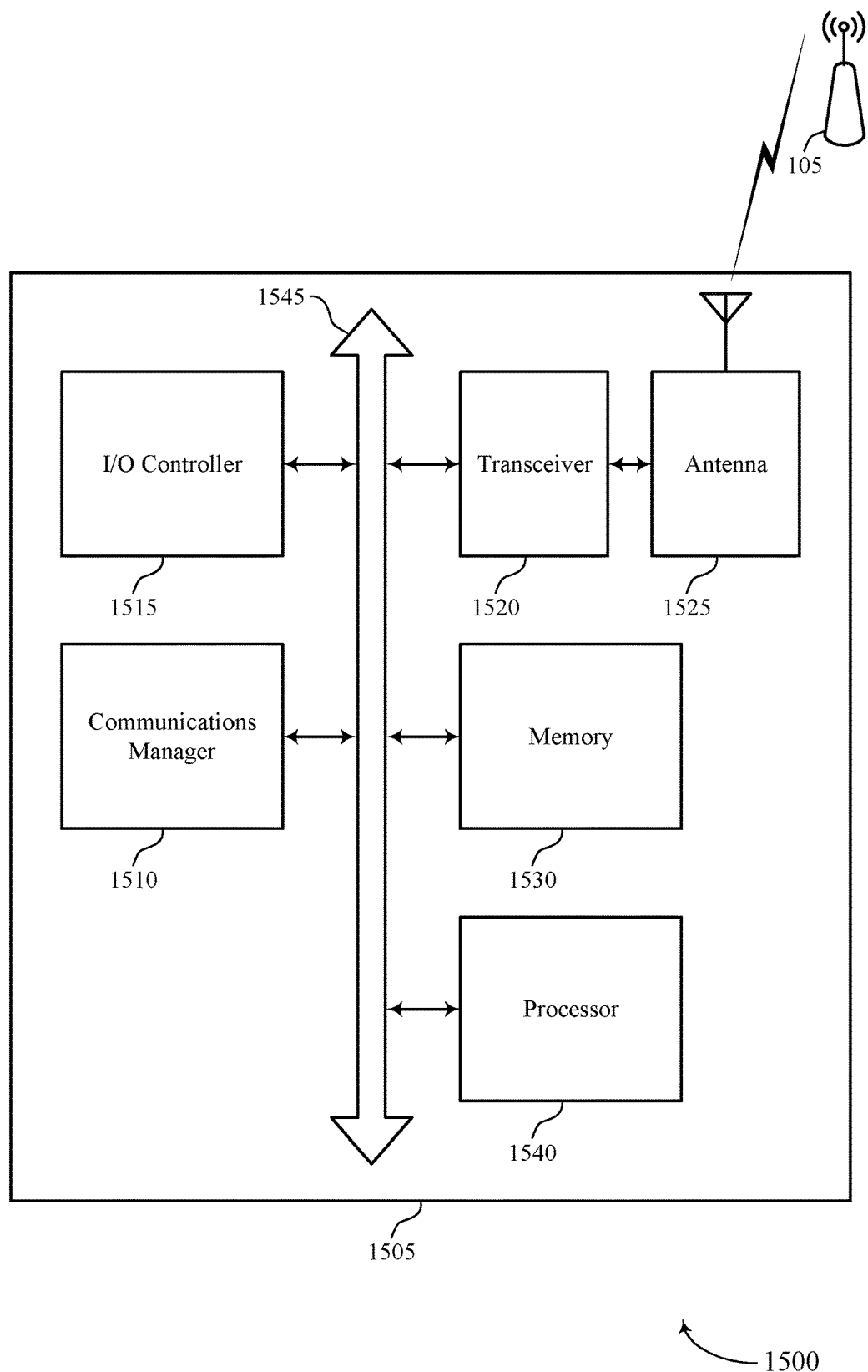
FIG. 15 shows a diagram of a system including a device that supports scanning enhancements for next generation Wi-Fi channels in accordance with aspects of the present disclosure.

FIG. 15 shows a diagram of a system 1500 including a device 1505 that supports scanning enhancements for next generation Wi-Fi in greenfield channels in accordance with aspects of the present disclosure. The device 1505 may be an example of or include the components of device 1205, device 1305, or a STA as described herein. The device 1505 may include components for bi-directional voice and data communications including components for transmitting and receiving communications, including a communications manager 1510, an I/O controller 1515, a transceiver 1520, an antenna 1525, memory 1530, and a processor 1540. These components may be in electronic communication via one or more buses (e.g., bus 1545).

The communications manager 1510 may identify, from a set of channels in a radio frequency spectrum band, a subset of discovery channels designated for discovery signaling for device association, receive discovery information from an AP for determining one or more channel access rules or whether to associate with the AP over a discovery channel from the identified subset of discovery channels, transmit an association request to an access point based on the discovery information transmitted over the discovery channel, and associate with the access point based on the association request and the discovery channel.

I/O controller 1515 may manage input and output signals for device 1505. I/O controller 1515 may also manage peripherals not integrated into device 1505. In some cases, I/O controller 1515 may represent a physical connection or port to an external peripheral. In some cases, I/O controller 1515 may utilize an operating system such as iOS®, ANDROID®, MS-DOS®, MS-WINDOWS®, OS/2®, UNIX®, LINUX®, or another known operating system. In other cases, I/O controller 1515 may represent or interact with a modem, a keyboard, a mouse, a touchscreen, or a similar device. In some cases, I/O controller 1515 may be implemented as part of a processor. In some cases, a user may interact with device 1505 via I/O controller 1515 or via hardware components controlled by I/O controller 1515.

Transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

Memory 1530 may include RAM and ROM. The memory 1530 may store computer-readable, computer-executable software including instructions that, when executed, cause the processor to perform various functions described herein. In some cases, the memory 1530 may contain, among other things, a BIOS which may control basic hardware or software operation such as the interaction with peripheral components or devices.

Processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1540 may be configured to operate a memory array using a memory controller. In other cases, a memory controller may be integrated into processor 1540. Processor 1540 may be configured to execute computer-readable instructions stored in a memory to perform various functions (e.g., functions or tasks supporting scanning enhancements for next generation Wi-Fi in greenfield channels).

Figure 16:
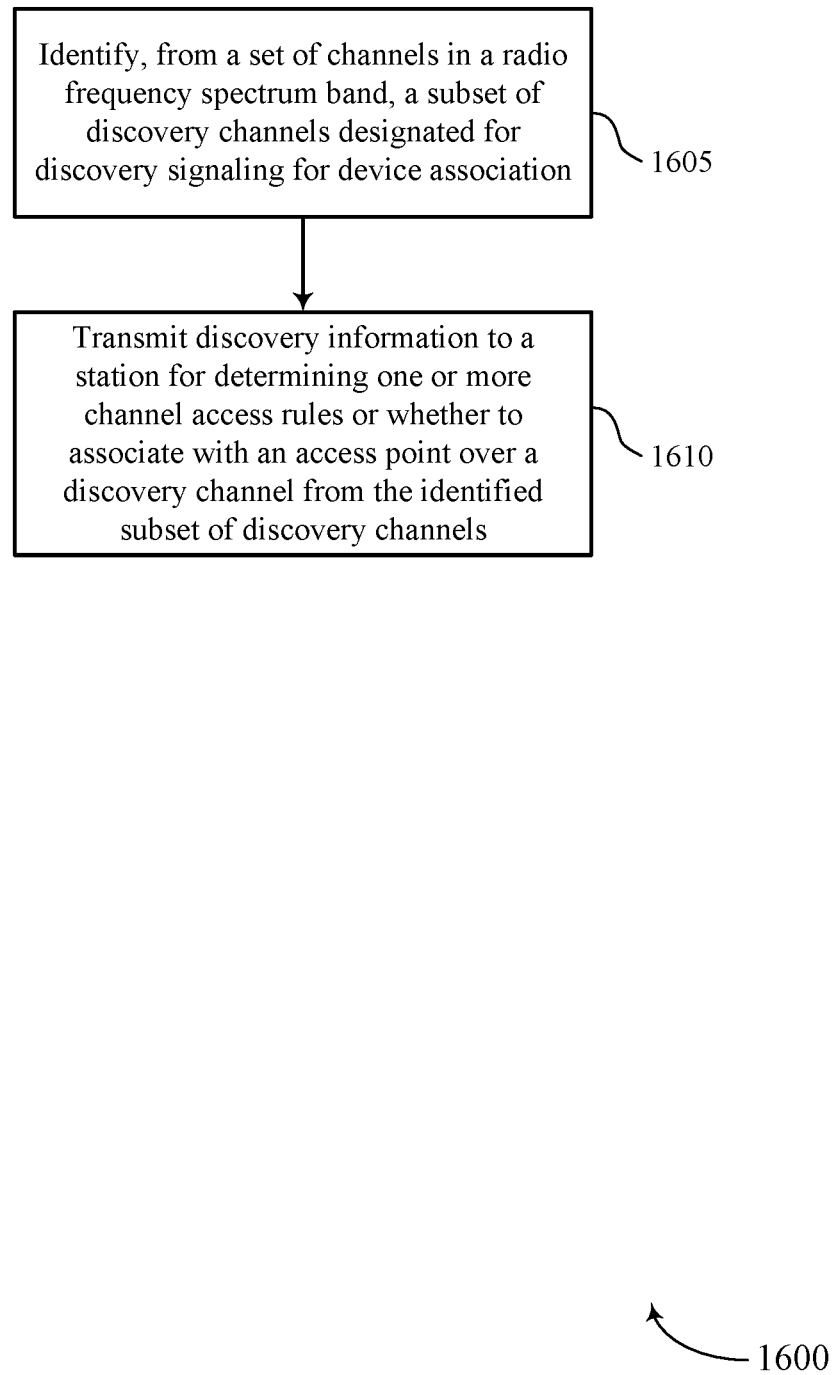
FIGS. 16 through 20 show flowcharts illustrating methods that support scanning enhancements for next generation Wi-Fi channels in accordance with aspects of the present disclosure.

FIG. 16 shows a flowchart illustrating a method 1600 that supports scanning enhancements for next generation Wi-Fi in greenfield channels in accordance with aspects of the present disclosure. The operations of method 1600 may be implemented by an AP or its components as described herein. For example, the operations of method 1600 may be performed by a communications manager as described with reference to FIGS. 8 through 11. In some examples, an AP may execute a set of instructions to control the functional elements of the AP to perform the functions described below. Additionally, or alternatively, an AP may perform aspects of the functions described below using special-purpose hardware.

At 1605, the AP may identify, from a set of channels in a radio frequency spectrum band, a subset of discovery channels designated for discovery signaling for device association. The operations of 1605 may be performed according to the methods described herein. In some examples, aspects of the operations of 1605 may be performed by a discovery channel identifier as described with reference to FIGS. 8 through 11.

At 1610, the AP may transmit discovery information to a STA for determining one or more channel access rules or whether to associate with an AP over a discovery channel from the identified subset of discovery channels. The operations of 1610 may be performed according to the methods described herein. In some examples, aspects of the operations of 1610 may be performed by a discovery information manager as described with reference to FIGS. 8 through 11.

Figure 17:
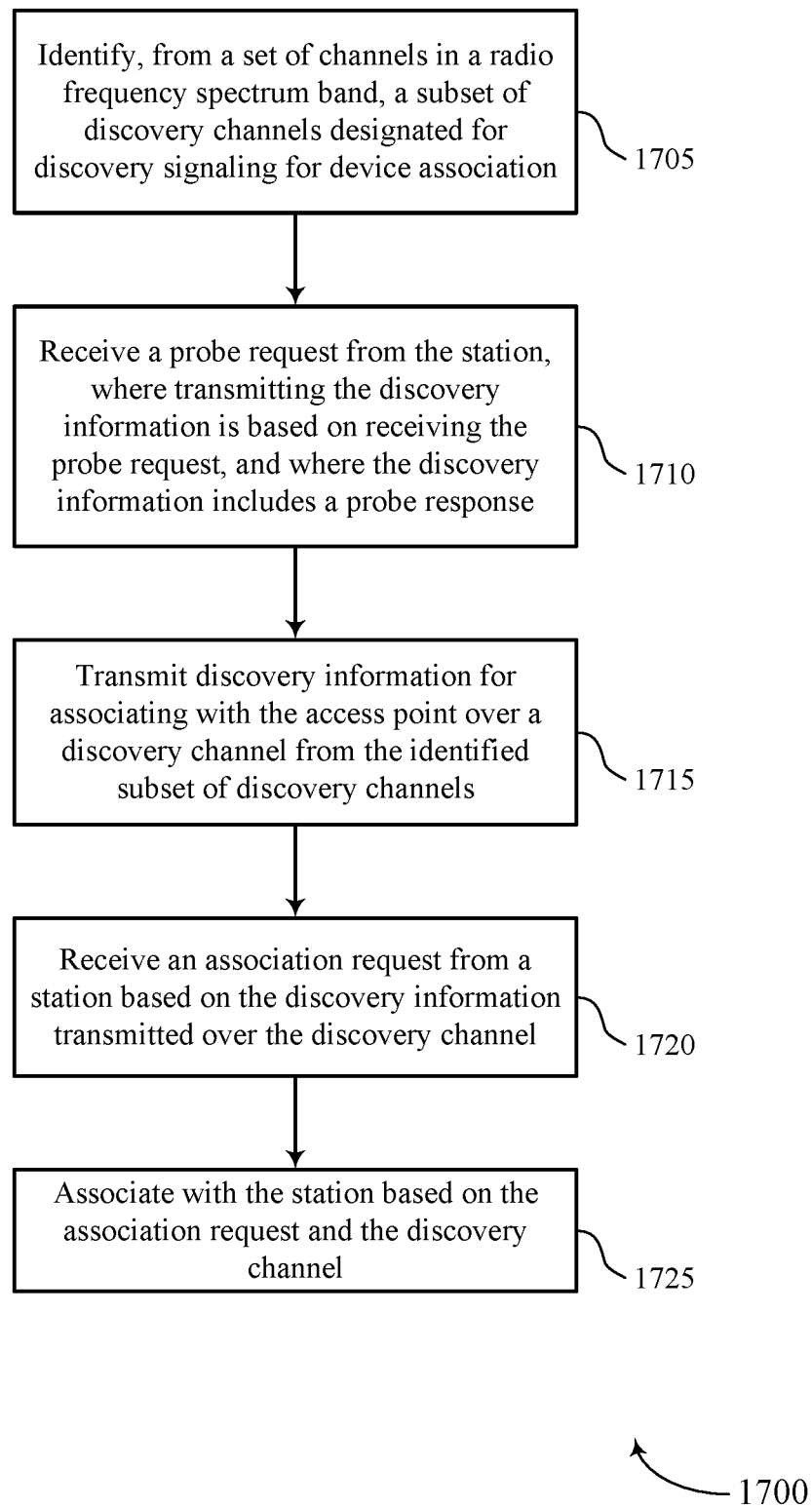

FIG. 17 shows a flowchart illustrating a method 1700 that supports scanning enhancements for next generation Wi-Fi in greenfield channels in accordance with aspects of the present disclosure. The operations of method 1700 may be implemented by an AP or its components as described herein. For example, the operations of method 1700 may be performed by a communications manager as described with reference to FIGS. 8 through 11. In some examples, an AP may execute a set of instructions to control the functional elements of the AP to perform the functions described below. Additionally, or alternatively, an AP may perform aspects of the functions described below using special-purpose hardware.

At 1705, the AP may identify, from a set of channels in a radio frequency spectrum band, a subset of discovery channels designated for discovery signaling for device association. The operations of 1705 may be performed according to the methods described herein. In some examples, aspects of the operations of 1705 may be performed by a discovery channel identifier as described with reference to FIGS. 8 through 11.

At 1710, the AP may receive a probe request from the station, where transmitting the discovery information is based on receiving the probe request, and where the discovery information includes a probe response. The operations of 1710 may be performed according to the methods described herein. In some examples, aspects of the operations of 1710 may be performed by a probe request manager as described with reference to FIGS. 8 through 11.

At 1715, the AP may transmit discovery information to a STA for determining one or more channel access rules or whether to associate with an AP over a discovery channel from the identified subset of discovery channels. The operations of 1715 may be performed according to the methods described herein. In some examples, aspects of the operations of 1715 may be performed by a discovery information manager as described with reference to FIGS. 8 through 11.

At 1720, if a STA determines to associate with the AP, the AP may receive an association request from a station based on the discovery information transmitted over the discovery channel. The operations of 1720 may be performed according to the methods described herein. In some examples, aspects of the operations of 1720 may be performed by an association manager as described with reference to FIGS. 8 through 11.

At 1725, the AP may associate with the station based on the association request and the discovery channel. The operations of 1725 may be performed according to the methods described herein. In some examples, aspects of the operations of 1725 may be performed by an association manager as described with reference to FIGS. 8 through 11.

Figure 18:
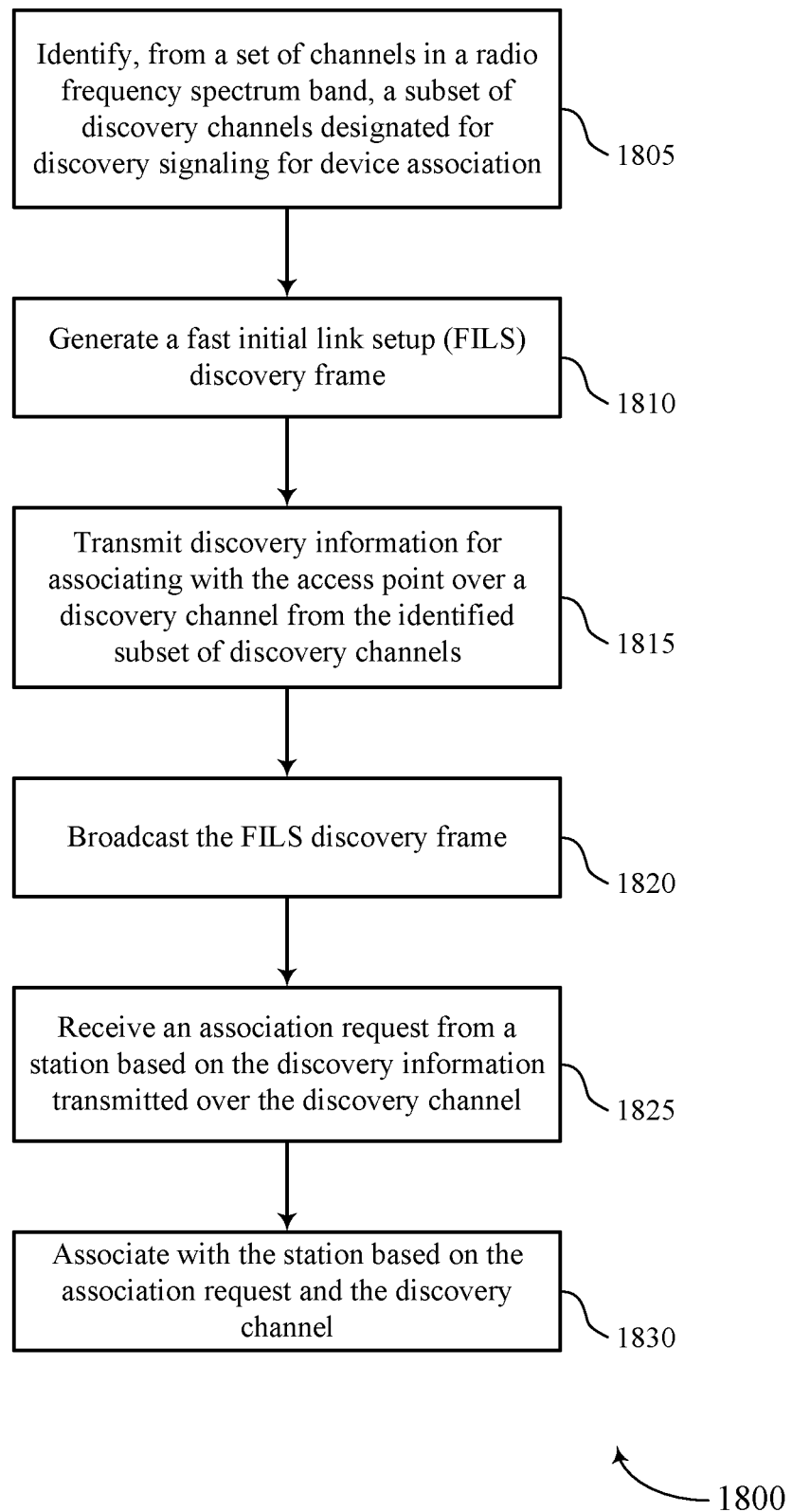

FIG. 18 shows a flowchart illustrating a method 1800 that supports scanning enhancements for next generation Wi-Fi in greenfield channels in accordance with aspects of the present disclosure. The operations of method 1800 may be implemented by an AP or its components as described herein. For example, the operations of method 1800 may be performed by a communications manager as described with reference to FIGS. 8 through 11. In some examples, an AP may execute a set of instructions to control the functional elements of the AP to perform the functions described below. Additionally, or alternatively, an AP may perform aspects of the functions described below using special-purpose hardware.

At 1805, the AP may identify, from a set of channels in a radio frequency spectrum band, a subset of discovery channels designated for discovery signaling for device association. The operations of 1805 may be performed according to the methods described herein. In some examples, aspects of the operations of 1805 may be performed by a discovery channel identifier as described with reference to FIGS. 8 through 11.

At 1810, the AP may generate a fast initial link setup (FILS) discovery frame. The operations of 1810 may be performed according to the methods described herein. In some examples, aspects of the operations of 1810 may be performed by a FILS discovery frame manager as described with reference to FIGS. 8 through 11.

At 1815, the AP may transmit discovery information to a STA for determining one or more channel access rules or whether to associate with an AP over a discovery channel from the identified subset of discovery channels. The operations of 1815 may be performed according to the methods described herein. In some examples, aspects of the operations of 1815 may be performed by a discovery information manager as described with reference to FIGS. 8 through 11.

At 1820, the AP may broadcast the FILS discovery frame. The operations of 1820 may be performed according to the methods described herein. In some examples, aspects of the operations of 1820 may be performed by a FILS discovery frame manager as described with reference to FIGS. 8 through 11.

At 1825, in the STA determines to associate with the AP, the AP may receive an association request from a station based on the discovery information transmitted over the discovery channel. The operations of 1825 may be performed according to the methods described herein. In some examples, aspects of the operations of 1825 may be performed by an association manager as described with reference to FIGS. 8 through 11.

At 1830, the AP may associate with the station based on the association request and the discovery channel. The operations of 1830 may be performed according to the methods described herein. In some examples, aspects of the operations of 1830 may be performed by an association manager as described with reference to FIGS. 8 through 11.

Figure 19:
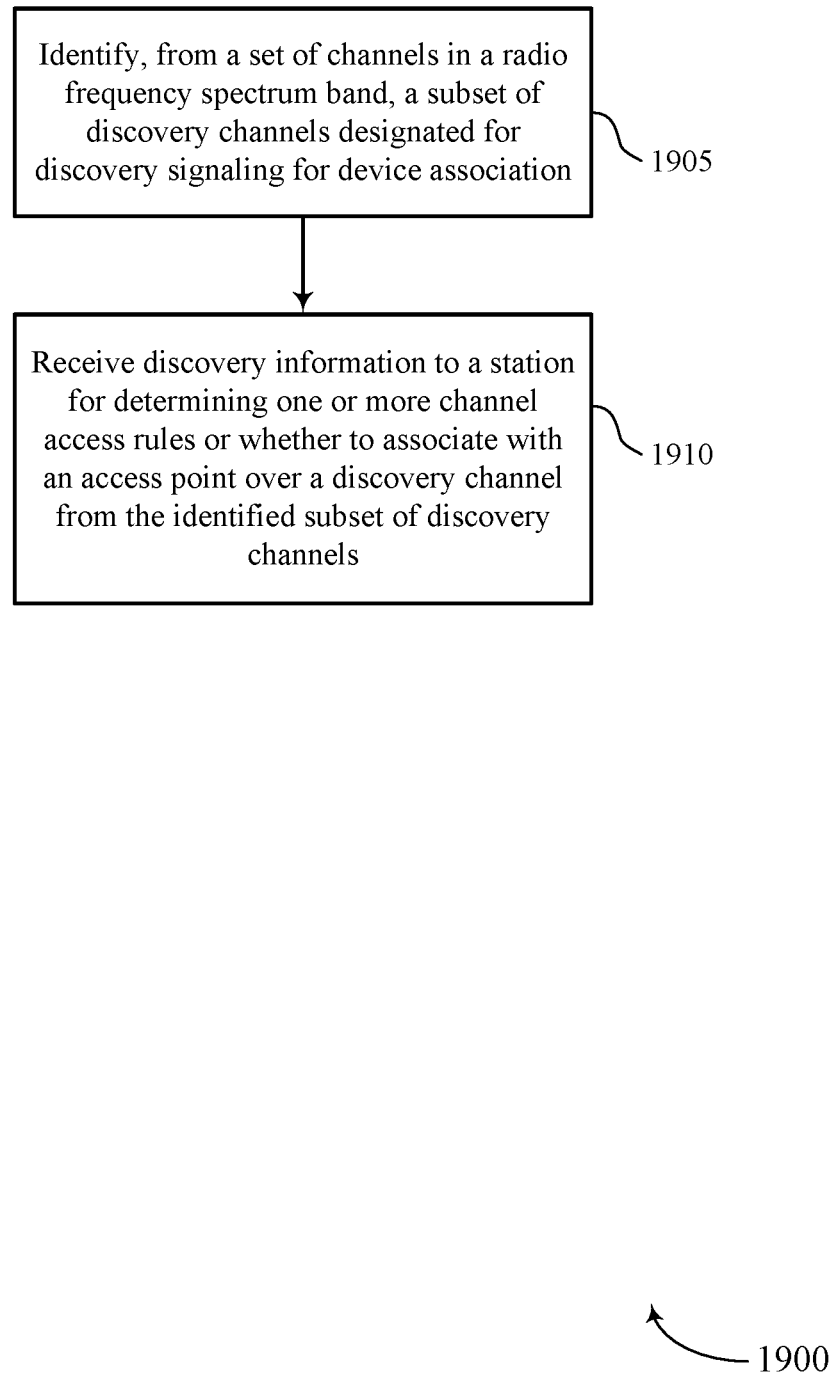

FIG. 19 shows a flowchart illustrating a method 1900 that supports scanning enhancements for next generation Wi-Fi in greenfield channels in accordance with aspects of the present disclosure. The operations of method 1900 may be implemented by a STA or its components as described herein. For example, the operations of method 1900 may be performed by a communications manager as described with reference to FIGS. 12 through 15. In some examples, a STA may execute a set of instructions to control the functional elements of the STA to perform the functions described below. Additionally, or alternatively, a STA may perform aspects of the functions described below using special-purpose hardware.

At 1905, the STA may identify, from a set of channels in a radio frequency spectrum band, a subset of discovery channels designated for discovery signaling for device association. The operations of 1905 may be performed according to the methods described herein. In some examples, aspects of the operations of 1905 may be performed by a discovery channel identifier as described with reference to FIGS. 12 through 15.

At 1910, the STA may receive discovery information to a STA for determining one or more channel access rules or whether to associate with an AP over a discovery channel from the identified subset of discovery channels. The operations of 1910 may be performed according to the methods described herein. In some examples, aspects of the operations of 1910 may be performed by a discovery information manager as described with reference to FIGS. 12 through 15.

Figure 20:
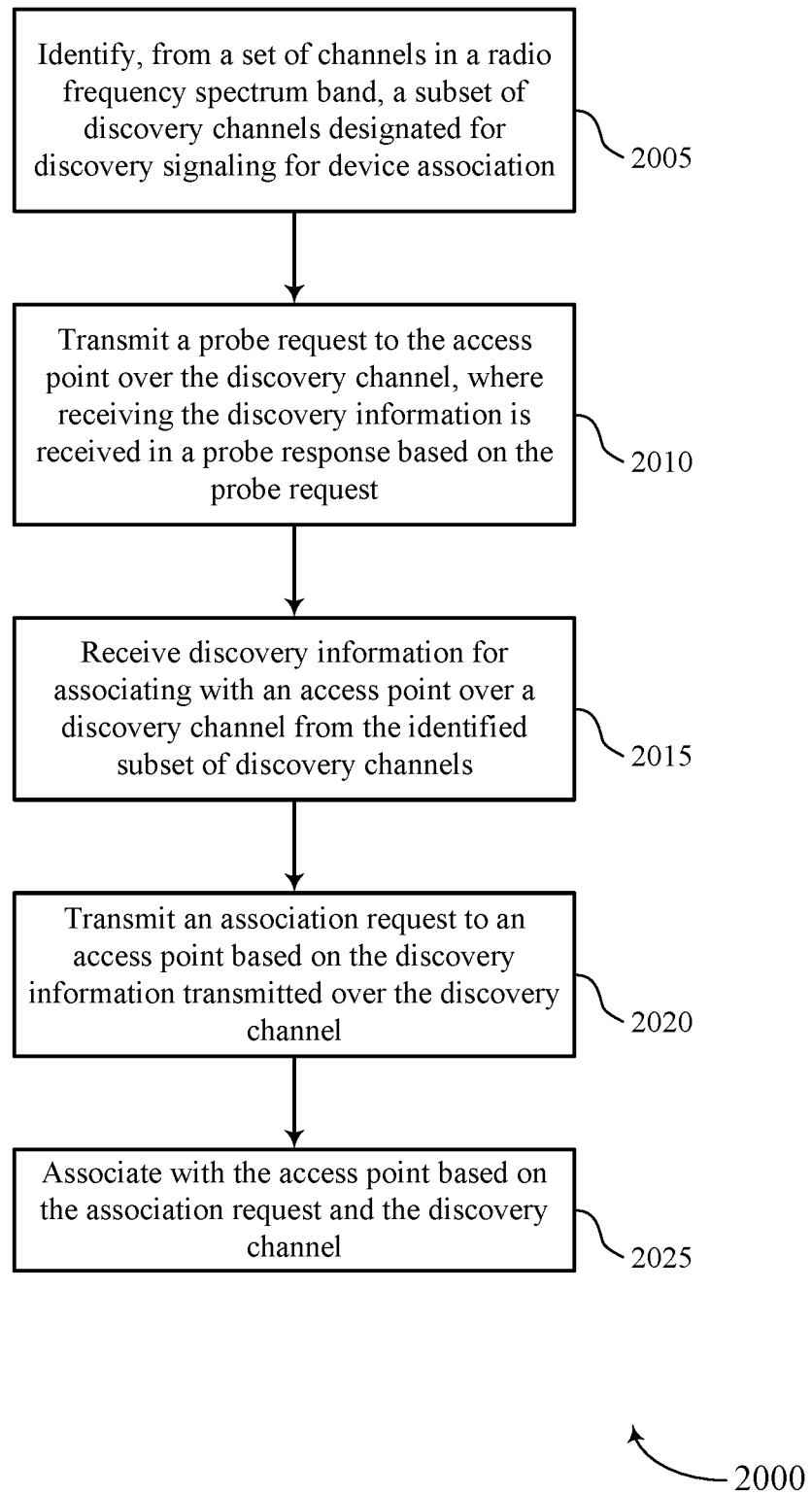

FIG. 20 shows a flowchart illustrating a method 2000 that supports scanning enhancements for next generation Wi-Fi in greenfield channels in accordance with aspects of the present disclosure. The operations of method 2000 may be implemented by a STA or its components as described herein. For example, the operations of method 2000 may be performed by a communications manager as described with reference to FIGS. 12 through 15. In some examples, a STA may execute a set of instructions to control the functional elements of the STA to perform the functions described below. Additionally, or alternatively, a STA may perform aspects of the functions described below using special-purpose hardware.

At 2005, the STA may identify, from a set of channels in a radio frequency spectrum band, a subset of discovery channels designated for discovery signaling for device association. The operations of 2005 may be performed according to the methods described herein. In some examples, aspects of the operations of 2005 may be performed by a discovery channel identifier as described with reference to FIGS. 12 through 15.

At 2010, the STA may transmit a probe request to the access point over the discovery channel, where receiving the discovery information is received in a probe response based on the probe request. The operations of 2010 may be performed according to the methods described herein. In some examples, aspects of the operations of 2010 may be performed by a probe request manager as described with reference to FIGS. 12 through 15.

At 2015, the STA may receive discovery information to a STA for determining one or more channel access rules or whether to associate with an AP over a discovery channel from the identified subset of discovery channels. The operations of 2015 may be performed according to the methods described herein. In some examples, aspects of the operations of 2015 may be performed by a discovery information manager as described with reference to FIGS. 12 through 15.

At 2020, if the STA determines to associate with the AP or if the STA is permitted under the channel access rules to transmit a management frame, the STA may transmit an association request to an access point based on the discovery information transmitted over the discovery channel. The operations of 2020 may be performed according to the methods described herein. In some examples, aspects of the operations of 2020 may be performed by an association manager as described with reference to FIGS. 12 through 15.

At 2025, the STA may associate with the access point based on the association request and the discovery channel. The operations of 2025 may be performed according to the methods described herein. In some examples, aspects of the operations of 2025 may be performed by an association manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 and WLAN 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at an access point, comprising: a first interface; a second interface; and a modem coupled to the first interface and the second interface, wherein the modem is configured to:

identify, from a plurality of channels in a radio frequency spectrum band, a subset of discovery channels designated for discovery signaling for device association, the subset of discovery channels comprising a set of non-contiguous channels having a non-unitary periodicity; and output, via the first interface, discovery information to a station for determining whether to associate with the access point over a channel from the plurality of channels, the channel comprising a discovery channel of the subset of discovery channels.

2. The apparatus of claim 1, wherein the modem is further configured to:
obtain, via the second interface, an association request from the station based at least in part on the discovery information transmitted over the discovery channel; and
associate with the station based at least in part on the association request and the discovery channel.

3. The apparatus of claim 1, wherein each channel of the subset of discovery channels comprises a 20 megahertz (MHz) channel, and wherein the non-unitary periodicity comprises 4 channels.

4. The apparatus of claim 1, wherein the modem is further configured to:
obtain, via the second interface, probe request from the station, wherein transmitting the discovery information is based at least in part on receiving the probe request, and wherein the discovery information comprises a probe response.

5. The apparatus of claim 4, wherein the modem is further configured to:
identify one or more neighbor access points; and
include a neighbor access point report indicating the identified one or more neighbor access points in the probe response.

6. The apparatus of claim 5, wherein at least one of the one or more neighbor access points are collocated with the reporting access point.

7. The apparatus of claim 5, wherein the modem is further configured to:
identify a first set of access points within a first bandwidth comprising the plurality of channels corresponding to a basic service set (BSS); and
identify a second set of access points that operate outside the first bandwidth, wherein the neighbor access point report includes both the first set of access points and the second set of access points.

8. The apparatus of claim 4, wherein the modem is further configured to:
randomly select a time for transmitting the probe response from a channel time for transmission of the probe response on the channel from the plurality of channels, wherein the channel from the plurality of channels comprises a discovery channel of the subset of discovery channels.

9. The apparatus of claim 4, wherein the modem is further configured to:
randomly select a resource unit (RU) of an orthogonal frequency division multiple access frame, wherein the probe response or an association response that is sent in response to the probe request is output via the first interface over the selected resource unit.

10. The apparatus of claim 9, wherein the RU is a broadcast RU carried on a downlink multi-user physical layer convergence procedure (PLCP) protocol data unit (PPDU).

11. The apparatus of claim 1, wherein the modem is further configured to:
generate a fast initial link setup (FILS) discovery frame; and
output, for broadcast via the first interface, the FILS discovery frame, wherein the FILS discovery frame is broadcast periodically.

12. The apparatus of claim 11, wherein the modem is further configured to:
obtain, via the second interface, a first broadcast probe request from a second station operating in an active scanning mode, wherein generating the FILS discovery frame and broadcasting the FILS discovery frame are based at least in part on the first broadcast probe request.

13. The apparatus of claim 11, wherein the modem is further configured to:
identify one or more neighbor access points; and
include a neighbor access point report indicating the identified one or more neighbor access points in the FILS discovery frame.

14. The apparatus of claim 1, wherein the modem is further configured to:
output, via the first interface, a management frame including a message integrity check (MIC) to a second access point.

15. The apparatus of claim 14, wherein the modem is further configured to:
detect a neighbor access point report transmitted by a second access point;
determine a number of neighbor access points indicated by the neighbor access point report; and
generate management frames with a periodicity that is based at least in part on the number of neighbor access points.

16. The apparatus of claim 1, wherein outputting the discovery information further comprises outputting, for transmission, a broadcast message comprising the discovery information.

17. An apparatus for wireless communication at a station, comprising: a first interface; a second interface; and a modem coupled to the first interface and the second interface, wherein the modem is configured to:
identify, from a plurality of channels in a radio frequency spectrum band, a subset of discovery channels designated for discovery signaling for device association, the subset of discovery channels comprising a set of non-contiguous channels having a non-unitary periodicity; and
obtain, via the second interface, discovery information from an access point for determining whether to associate with the access point over a channel from the plurality of channels, the channel comprising a discovery channel of the subset of discovery channels.

18. The apparatus of claim 17, wherein the modem is further configured to:
output, via the first interface, an association request to the access point based at least in part on the discovery information transmitted over the discovery channel; and
associate with the access point based at least in part on the association request and the discovery channel.

19. The apparatus of claim 17, wherein each channel of the subset of discovery channels comprises a 20 megahertz (MHz) channel, and wherein the non-unitary periodicity comprises 4 channels.

20. The apparatus of claim 17, wherein the modem is further configured to:
scan the subset of discovery channels, wherein receiving the discovery information on the discovery channel is based at least in part on the scanning.

21. The apparatus of claim 17, wherein the modem is further configured to:
output, via the first interface, a probe request to the access point over the channel from the plurality of channels, wherein the channel from the plurality of channels comprises a discovery channel of the subset of discovery channels, and wherein receiving the discovery information is received in a probe response based at least in part on the probe request.

22. The apparatus of claim 21, wherein the modem is further configured to:
output, for broadcast via the first interface, the probe request while operating in an active scanning mode; and
wherein receiving the discovery information from the access point for determining whether to associate with the access point comprises receiving a probe response from a neighboring access point in response to the probe request, the probe response including a neighbor access point report corresponding to the access point.

23. The apparatus of claim 21, wherein the probe response is received as one or more of an acknowledgement (ACK) frame or an orthogonal frequency-division multiple access (OFDMA) frame.

24. The apparatus of claim 23, wherein the modem is further configured to:
obtain, via the second interface, an acknowledgement (ACK) frame based at least in part on the probe request;
refrain from transmitting a second probe request for a minimum channel time for transmitting on the discovery channel; and
obtain, via the second interface, during the minimum channel time, the probe response.

25. The apparatus of claim 21, wherein the modem is further configured to:
identify a minimum channel time for transmitting the probe request to the access point over the discovery channel, wherein outputting the probe request further comprises outputting, via the first interface, the probe request prior to expiration of the minimum channel time.

26. The apparatus of claim 21, wherein the modem is further configured to:
output, for broadcast via the first interface, the probe request while operating in an active scanning mode; and
wherein receiving the discovery information from the access point for determining whether to associate with the access point comprises receiving a probe response from a neighboring access point in response to the probe request, the probe response including a neighbor access point report corresponding to the access point.

27. The apparatus of claim 26, wherein at least one or more neighbor access points indicated in the neighbor access point report are collocated with the reporting access point.

28. The apparatus of claim 21, wherein the modem is further configured to:
obtain, via the second interface, a propagation configuration message from the access point;
reconfigure to a management information propagation mode;
obtain, via the second interface, management information from the access point; and
output, via the first interface, the management information to a second access point.

29. The apparatus of claim 28, wherein the propagation configuration message comprises a trigger frame.

30. The apparatus of claim 17, wherein the modem is further configured to:
identify a restricted access mode based at least in part on one or more channel access rules;
determine that an unsolicited management frame is not permitted on the radio frequency spectrum band based at least in part on the restricted access mode; and
wait to receive a random access resource unit (RU) from the station or transmitting a probe request on a second radio frequency spectrum band based at least in part on the restricted access mode.

31. The apparatus of claim 17, wherein obtaining the discovery information further comprises obtaining a broadcast message comprising the discovery information.

32. A method for wireless communication at an access point, comprising:
identifying, from a plurality of channels in a radio frequency spectrum band, a subset of discovery channels designated for discovery signaling for device association, the subset of discovery channels comprising a set of non-contiguous channels having a non-unitary periodicity; and
transmitting discovery information to a station for determining whether to associate with the access point over a channel from the plurality of channels, the channel comprising a discovery channel of the subset of discovery channels.

33. The method of claim 32, wherein the discovery information is located on a first resource unit (RU) of a set of RUs on a sub-channel associated with the discovery channel, wherein the set of RUs is carried on a downlink multi-user physical layer convergence procedure (PLCP) protocol data unit (PPDU).

34. The method of claim 32, further comprising:
receiving an association request from the station based at least in part on the discovery information transmitted over the discovery channel; and
associating with the station based at least in part on the association request and the discovery channel.

35. The method of claim 32, further comprising:
receiving a probe request from the station, wherein transmitting the discovery information is based at least in part on receiving the probe request, and wherein the discovery information comprises a probe response.

36. The method of claim 35, further comprising:
identifying one or more neighbor access points; and
including a neighbor access point report indicating the identified one or more neighbor access points in the probe response.

37. The method of claim 32, further comprising:
generating a fast initial link setup (FILS) discovery frame; and
broadcasting the FILS discovery frame.

38. The method of claim 37, wherein the FILS discovery frame is broadcast periodically.

39. The method of claim 37, further comprising:
identifying one or more neighbor access points; and
including a neighbor access point report indicating the identified one or more neighbor access points in the FILS discovery frame.

40. The method of claim 39, further comprising:
receiving a first broadcast probe request from a second station operating in an active scanning mode, wherein generating the FILS discovery frame and broadcasting the FILS discovery frame are based at least in part on the received first broadcast probe request.

41. The method of claim 32, further comprising:
transmitting a management frame including a message integrity check (MIC) to a second access point.

42. A method for wireless communication at a station, comprising:
identifying, from a plurality of channels in a radio frequency spectrum band, a subset of discovery channels designated for discovery signaling for device association, the subset of discovery channels comprising a set of non-contiguous channels having a non-unitary periodicity; and
receiving discovery information from an access point for determining whether to associate with the access point over a channel from the plurality of channels, the channel comprising a discovery channel of the subset of discovery channels.

43. The method of claim 42, further comprising:
scanning the subset of discovery channels, wherein receiving the discovery information on the discovery channel is based at least in part on the scanning.

44. The method of claim 42, further comprising:
transmitting an association request to the access point based at least in part on the discovery information transmitted over the discovery channel; and
associating with the access point based at least in part on the association request and the discovery channel.

45. The method of claim 42, further comprising:
transmitting a probe request to the access point over the discovery channel, wherein receiving the discovery information is received in a probe response based at least in part on the probe request.

46. The method of claim 45, further comprising:
identifying a minimum channel time for transmitting the probe request to the access point over the discovery channel, wherein transmitting the probe request further comprises transmitting the probe request prior to expiration of the minimum channel time.

47. The method of claim 45, further comprising:
receiving a propagation configuration message from the access point;
reconfiguring to a management information propagation mode;
receiving management information from the access point; and
transmitting the management information to a second access point.

48. The method of claim 45, wherein the probe response is received as one or more of: an acknowledgement (ACK) frame or an orthogonal frequency-division multiple access (OFDMA) frame.

49. The method of claim 48, further comprising:
receiving an acknowledgement (ACK) frame based at least in part on the probe request;
refraining from transmitting a second probe request for a minimum channel time for transmitting on the discovery channel; and
receiving, during the minimum channel time, the probe response.

50. The method of claim 42, further comprising:
identifying a restricted access mode based at least in part on one or more channel access rules;
determining that an unsolicited management frame is not permitted on the radio frequency spectrum band based at least in part on the restricted access mode; and
waiting to receive a random access resource unit (RU) from the station or transmitting a probe request on a second radio frequency spectrum band based at least in part on the restricted access mode.

51. The method of claim 42, further comprising:
broadcasting a probe request while operating in an active scanning mode; and
wherein receiving the discovery information from the access point for determining whether to associate with the access point comprises receiving a probe response from a neighboring access point in response to the probe request, the probe response including a neighbor access point report corresponding to the access point.

* * * * *